US012748217B2

(12) United States Patent
El-Sheimy et al.

(10) Patent No.: US 12,748,217 B2
(45) Date of Patent: Sep. 29, 2026

(54) SNAPSHOT GNSS RECEIVER AND METHOD USING SUPER-LONG COHERENT INTEGRATION AND FRACTIONAL FOURIER TRANSFORM

(71) Applicant: UTI Limited Partnership, Calgary (CA)

(72) Inventors: Naser El-Sheimy, Calgary (CA); Yiran Luo, Calgary (CA)

(73) Assignee: UTI LIMITED PARTNERSHIP, Calgary (CA)

( * ) Notice: Subject to any disclaimer, the term of this patent is extended or adjusted under 35 U.S.C. 154(b) by 234 days.

(21) Appl. No.: 18/441,018

(22) Filed: Feb. 14, 2024

(65) Prior Publication Data

US 2024/0295663 A1 Sep. 5, 2024

Related U.S. Application Data

(60) Provisional application No. 63/487,303, filed on Feb. 28, 2023.

(51) Int. Cl.

| | |
|---|---|
| ***G01S 19/24*** | (2010.01) |
| ***G01S 19/29*** | (2010.01) |
| ***G01S 19/30*** | (2010.01) |
| ***G01S 19/37*** | (2010.01) |
| ***G01S 19/39*** | (2010.01) |

(52) U.S. Cl.

CPC ............ *G01S 19/246* (2013.01); *G01S 19/29* (2013.01); *G01S 19/30* (2013.01); *G01S 19/37* (2013.01); *G01S 19/396* (2019.08)

(58) Field of Classification Search

None

See application file for complete search history.

(56) References Cited

PUBLICATIONS

CN-118444346-A translation (Year: 2024).*

Dierendonck, "GPS Receivers," In B. W. Parkinson, J. J. Spilker Jr, P. Axelrad, & P. Enge (Eds.), Global Positioning System: Theory and Applications, vol. 1. American Institute of Aeronautics and Astronautics, Inc. 1996.

Lashley et al., "Performance analysis of vector tracking algorithms for weak GPS signals in high dynamics". IEEE Journal on Selected Topics in Signal Processing, vol. 3(4), pp. 661-673. 2009.

(Continued)

*Primary Examiner* — Whitney Moore

(74) *Attorney, Agent, or Firm* — McDonald Hopkins LLC

(57) ABSTRACT

Snapshot receiver that comprises a correlator module for correlating incoming GNSS signals and a transform module that transforms resulting correlated outputs using a Fractional Fourier Transform (FrFT) process, to thereby compensate for weak and dynamic signals. The output of the transform module is an estimated Doppler rate with high accuracy. The estimated Doppler rate is passed to a super-resolution-measurement (SRM) module, which outputs error values of the estimated Doppler rate and a pseudorange (measured distance-to-satellite) via a phase dead reckoning (DR) calculation for the snapshot receiver. The pseudorange and error values are passed to a navigator module that determines position information based on those inputs. In some embodiments, the SRM module comprises a maximum likelihood estimator (MLE).

18 Claims, 11 Drawing Sheets

(56) References Cited

PUBLICATIONS

Pany et al., "Use of a Vector Delay Lock Loop Receiver for GNSS Signal Power Analysis in Bad Signal Conditions". 2006 IEEE/ION Position, Location, and Navigation Symposium, 2006, 893-903. 2006.
Maier et al., "Multipath and Attitude Estimation Phase Lock Loop for Antenna Array Signal Processing". In proceedings of ION GNSS+ 2021, pp. 3402-3421. 2021.
Gowdayyanadoddi et al., "Benefits of an ultra stable oscillator for long coherent integration," in Proceedings of the 27th International Technical Meeting of the Satellite Division of the Institute of Navigation (ION GNSS+ 2014), 2014, pp. 1578-1594.
Soloviev et al., "Extending GPS carrier phase availability indoors with a deeply integrated receiver architecture," IEEE Wireless Communications, vol. 18, No. 2, pp. 36-44, Apr. 2011.
Faragher et al., "Supercorrelation as a Service: S-GNSS Upgrades for Smartdevices," in Proceedings of the 32nd International Technical Meeting of the Satellite Division of the Institute of Navigation (ION GNSS+ 2019), Sep. 16-20, Miami, Florida, USA, 2019.
Groves et al., "Combining Inertially-aided Extended Coherent Integration (Supercorrelation) with 3D-Mapping-Aided GNSS," in Proceedings of the 33rd International Technical Meeting of the Satellite Division of the Institute of Navigation (ION GNSS+ 2020), Sep. 2020, pp. 2327-2346.
Stirling-Gallacher et al., "A fast acquisition technique for a direct sequence spread spectrum signal in the presence of a large Doppler shift". Proceedings of ISSSTA'95 International Symposium on Spread Spectrum Techniques and Applications, vol. 1, pp. 156-160. 1996.
Li et al., "Super-Resolution TOA Estimation With Diversity for Indoor Geolocation". IEEE Transactions on Wireless Communications, vol. 3(1), pp. 224-234. 2004.
Ozaktas et al., "Digital computation of the fractional Fourier transform". IEEE Transactions on Signal Processing, vol. 44, No. 9, pp. 2141-2150. 1996.
Luo et al., "A GNSS software-defined receiver with vector tracking techniques for land vehicle navigation". Proceedings of the 2019 Pacific PNT Meeting, Honolulu, Hawaii, USA, Apr. 8-11, Apr. 2019, 713-727. 2019.
Luo et al., "A Novel Doppler Rate Estimator Based on Fractional Fourier Transform for High-Dynamic GNSS Signal". IEEE Access, vol. 7, pp. 29575-29596. 2019.
Luo et al., "Assessment of Ultra-Tightly Coupled GNSS/INS Integration System towards Autonomous Ground Vehicle Navigation Using Smartphone IMU". IEEE International Conference on Signal, Information and Data Processing (ICSIDP), pp. 1-6. 2019.
Luo et al., "An improved DE-KFL for BOC signal tracking assisted by FRFT in a highly dynamic environment" IEEE/ION Position, Location and Navigation Symposium, PLANS 2018—Proceedings, pp. 1525-1534. 2018.
Luo et al., "An Acquisition Algorithm Based on FRFT for Weak GNSS Signals in a Dynamic Environment," IEEE Communications Letters, vol. 22, No. 6, pp. 1212-1215. 2018.

* cited by examiner

SNAPSHOT GNSS RECEIVER AND METHOD USING SUPER-LONG COHERENT INTEGRATION AND FRACTIONAL FOURIER TRANSFORM

CROSS REFERENCE TO RELATED APPLICATIONS

This application claims priority to U.S. Provisional App. No. 63/487,303, filed on Feb. 28, 2023, entitled "SNAPSHOT GNSS RECEIVER AND METHOD USING SUPER-LONG COHERENT INTEGRATION AND FRACTIONAL FOURIER TRANSFORM", the entire disclosure of which is hereby incorporated by reference.

TECHNICAL FIELD

The present invention relates to GNSS positioning. More specifically, the present invention relates to a snapshot receiver for determining position information.

BACKGROUND

High-precision positioning using global navigation satellite system (GNSS) signals and receivers is critical for many applications. Examples include navigation for pedestrians and cyclists through smartphones and wearable sensors, navigation for autonomous and piloted ground vehicles, etc. These applications always depend on low-cost antennas and hardware, and demand for consumer-level GNSS receivers is likely to significantly increase. Snapshot GNSS receivers, in particular, which only sample the received signal for a brief time, may be particularly useful.

However, because of the crowded nature of urban environments, the baseband of GNSS receivers is confronted with challenges in providing continuous and high-quality measurements. That is, due to path interference from urban buildings, etc., incoming GNSS signals are often weak and dynamic, which causes the traditional GNSS baseband architecture to be very fragile. In particular, the severe multipath/non-line-of-sight (NLOS) interference, signal interruption, and signal power attenuation cause the estimation of line-of-sight (LOS) signals in the baseband processing to be much more difficult.

Such multipath signals distort the distribution of correlation gains with respect to the code offset. For clarity, the classic GNSS baseband architecture consists of code/carrier numerically controlled oscillators (NCOs), correlators, code/carrier phase discriminators, and code/carrier loop filters. A phase/frequency lock loop (PLL/FLL) and a delay lock loop (DLL) separately process the code and carrier components of GNSS signals, respectively ([1]). To enhance the sensitivity of weak signal processing, vector tracking and ultra-tight integration technique have been applied to the traditional baseband (see e.g. [2]-[5]). However, these approaches are subject to challenges, including: how to properly determine an integration time and a loop filter bandwidth; that a relatively accurate initial code phase and Doppler frequency is required through acquisition, in order to guarantee a reliable lock at the beginning of tracking; and that, at the start of the tracking process, it takes some time for loop filters to converge.

Efforts described in [4] explore the super-long coherent integration (S-LCI) for separating such multipath signals with an ultra-stable oscillator with the aid of Doppler rate estimation from a reference receiver (see also [5]). An ultra-tight coupling technique using an inertial sensor to aid the GNSS baseband receiver has also been considered and shows high sensitivity in both urban and indoor navigation [6]. As well, low-cost GNSS devices with a one-second S-LCI implementation have also demonstrated accurate positioning performance in urban canyons [7], [8]. However, in previous implementations, bit-sign transitions resulting from the navigation data modulated in previous/traditional GNSS signals could hinder power accumulation in the long coherent integration (LCI)/S-LCI implementation.

In contrast, modernized GPS L5 signals (i.e., the third civilian Global Positioning System signals) are composed of two channels: an in-phase data channel and a quadrature data-less pilot channel. As the pilot channel includes no navigation data, it is available for a long correlating process without external aiding. In particular, a known secondary code sequence is modulated in the pilot channel. As such, LCI/S-LCI processed can be performed without bit-sign estimation. Moreover, the modernized GNSS signals are becoming far more common worldwide, as Beidou System (BDS) B2a and Galileo E5a signals have very similar modulations and structures to those of the GPS L5 signal. In addition to the L5 bands, other GNSS signal resources having pilot channels able to process in a bit-free manner are also available at the L1 bands, such as GPS/QZSS LIC, Galileo E1, and Beidou B1C.

However, through LCI/S-LCI, the baseband becomes more vulnerable to dynamic conditions. As the Doppler rate in the incoming signal increases, the correlation peak after the LCI/S-LCI decreases more easily. As such, there is a need for receivers and systems that overcome these deficiencies.

SUMMARY

This document discloses a snapshot receiver that comprises a correlator module for correlating incoming GNSS signals and a transform module that transforms resulting correlated outputs using a Fractional Fourier Transform (FrFT) process, to thereby compensate for weak and dynamic signals. The output of the transform module is an estimated averaging Doppler rate and an instantaneous Doppler frequency shift with high accuracy. These output values from the transform module are passed to an super-resolution measurement (SRM) module, which outputs a pseudorange (measured distance-to-satellite) for the snapshot receiver and also outputs error values of the estimated Doppler rate, Doppler shift, code phase, and carrier phase. The pseudorange and error values are passed to a navigator module that determines position information based on those inputs. In some embodiments, the SRM module comprises a maximum likelihood estimator (MLE). In other embodiments, the SRM module comprises one or more similar/analogous optimizers, as are known in the art. In some embodiments, the SRM module comprises a phase dead reckoning module. In some embodiments, outputs of the correlator module comprise fast-time correlator outputs that are down-sampled to thereby produce slow-time correlator outputs, to which the FrFT is applied.

In a first aspect, this document discloses a snapshot receiver for determining position information, said snapshot receiver comprising: a receiving module for receiving a GNSS signal from a satellite; a processing module comprising: a correlator module for correlating said GNSS signal using time-domain integration of a plurality of samples of said GNSS signal, to thereby produce a correlated signal; a transform module for applying a Fractional Fourier Transform (FrFT) process to said correlated signal to thereby produce an estimated Doppler rate; and a super-resolution measurement (SRM) module for receiving the estimated Doppler rate and for determining error values of said estimated Doppler rate, and for determining a measured distance between said snapshot receiver and said satellite; and a navigator module for determining said position information based on said error values and said measured distance.

In another embodiment, this document discloses a snapshot receiver wherein said SRM module comprises a phase dead reckoning module for determining said error values and said measured distance.

In another embodiment, this document discloses a snapshot receiver wherein said SRM module comprises a maximum likelihood estimator (MLE) for determining said error values and said measured distance, wherein said error values and said measured distance are values that maximize a probability of convergence between said estimated Doppler rate and a modelled reference Doppler rate.

In another embodiment, this document discloses a snapshot receiver wherein said error values comprise a Doppler rate, Doppler frequency error, carrier phase error, and a code phase error of said estimated Doppler rate.

In another embodiment, this document discloses a snapshot receiver wherein said correlator comprises a plurality of correlation channels.

In another embodiment, this document discloses a snapshot receiver wherein said correlator applies super-long coherent integration (S-LCI).

In another embodiment, this document discloses a snapshot receiver wherein said transform module comprises a down-sampling submodule; said correlated signal comprises fast-time correlator outputs; said down-sampling submodule down-samples said fast-time correlator outputs to thereby produce slow-time correlator outputs; and said FrFT is applied to said slow-time correlator outputs.

In another embodiment, this document discloses a snapshot receiver wherein said estimated Doppler rate is passed through a pre-processing module before being passed to the SRM module.

In another embodiment, this document discloses a snapshot receiver wherein said MLE applies a gradient descent optimization process when determining said error values and said measured distance.

In a second aspect, this document discloses a method for determining position information, said method comprising the steps of: receiving a GNSS signal from a satellite; correlating said GNSS signal using time-domain integration of a plurality of samples of said GNSS signal, to thereby produce a correlated signal; applying a Fractional Fourier Transform (FrFT) process to said correlated signal to thereby produce an estimated Doppler rate, wherein said estimated Doppler rate has an associated probability distribution; and determining error values of said estimated Doppler rate; based on the estimated Doppler rate, determining a measured distance between said snapshot receiver and said satellite; and determining said position information based on said error values and said measured distance.

In another embodiment, this document discloses a method wherein determining said error values and said measured distance uses a phase dead reckoning computation based on super-resolution (SR) Doppler estimation.

In another embodiment, this document discloses a method wherein determining said error values and said measured distance uses maximum likelihood estimation (MLE), such that said error values and said measured distance are values that maximize a probability of convergence between said estimated Doppler rate and a modelled reference Doppler rate.

In another embodiment, this document discloses a method wherein said error values comprise a Doppler rate error, Doppler frequency error, carrier phase error, and a code phase error of said estimated Doppler rate.

In another embodiment, this document discloses a method wherein a plurality of correlation channels are used in said step of correlating.

In another embodiment, this document discloses a method wherein said time-domain integration is super-long coherent integration (S-LCI).

In another embodiment, this document discloses a method wherein said correlated signal comprises fast-time correlator outputs, and wherein said method further comprises down-sampling said fast-time correlator outputs to thereby produce slow-time correlator outputs before applying said FrFT.

In another embodiment, this document discloses a method further comprising pre-processing said estimated Doppler rate before determining said error values and said measured distance.

In another embodiment, this document discloses a method wherein said MLE applies a gradient descent optimization process when determining said error values and said measured distance.

BRIEF DESCRIPTION OF THE DRAWINGS

The present invention will now be described by reference to the following figures, in which identical reference numerals refer to identical elements and in which.

DETAILED DESCRIPTION

To better understand the present invention, the reader is directed to the listing of citations at the end of this description. For ease of reference, these citations and references have been referred to by their listing number throughout this document. The contents of the citations in the list at the end of this description are hereby incorporated by reference herein in their entirety.

The present invention discloses a snapshot receiver that correlates incoming GNSS signals and transforms resulting correlated outputs using a Fractional Fourier Transform (FrFT). An estimated Doppler rate is provided as the transformed output, and values associated with the estimated Doppler rate are determined by a super-resolution measurement (SRM) module and used to determine position information of the receiver.

Figure 1:
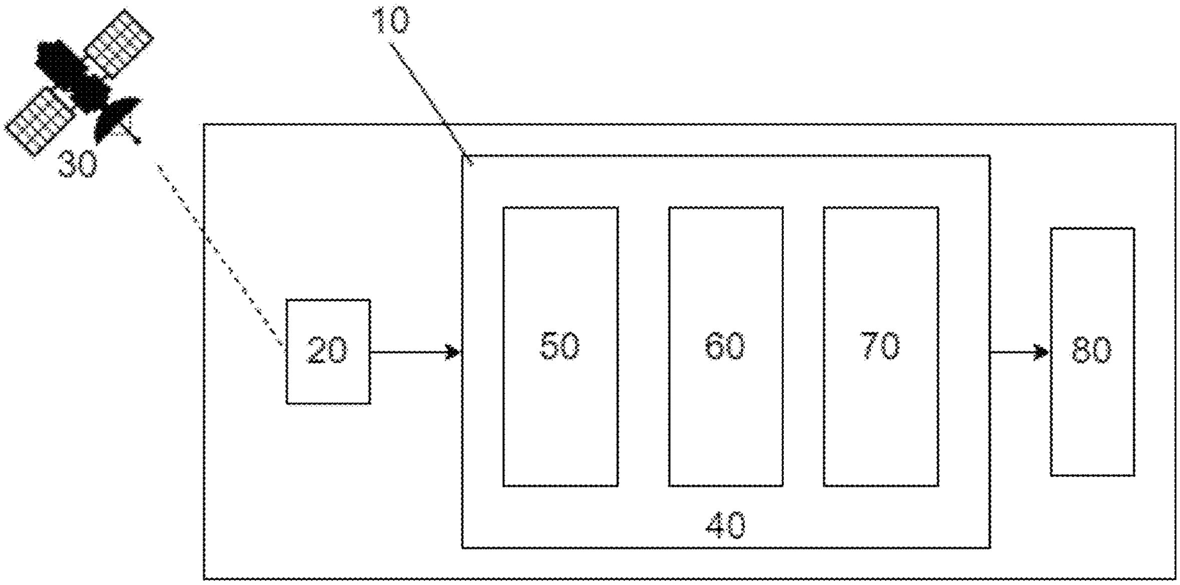
FIG. 1 is a schematic diagram of a snapshot receiver according to one aspect of the invention.

Referring now to FIG. 1, a snapshot receiver 10 according to an aspect of the invention is shown. (As should be clear, FIG. 1 is not to scale.) A receiving module 20 receives a GNSS signal from a satellite 30. The signal is passed to a processing module 40. The processing module 40 comprises a correlator module 50. The correlator module 50 performs time-domain integration of a plurality of samples of the signal, to thereby produce a correlated signal. The processing module 40 further comprises a transform module 60, which applies a Fractional Fourier Transform (FrFT) to the correlated signal to reduce noise. The output of the transform module 60 is an estimated Doppler rate and Doppler shift of the signal. The processing module 40 further comprises a super-resolution measurement (SRM) module 70 that determines error values of the estimated Doppler rate, Doppler shift, carrier phase, and a "pseudorange" of the signal (i.e., a distance between the satellite 30 and the receiver 10, as measured at the receiver 10), based on the estimated Doppler rate. Methods of determining the pseudorange of a receiver are well-known in the art. The error values and "pseudorange"/measured distance are then passed from the processing module 40 to a navigator module 80. The navigator module 80 determines position information based on the error values and pseudorange.

As noted above, the correlator module 50 performs time-domain integration using a plurality of samples of the incoming GNSS signal. As previously described, many such time-domain integration approaches are known in the art, including long coherent integration (LCI) and super-long coherent integration (S-LCI). In some embodiments, the correlator module 50 uses LCI. In other embodiments, the correlator module 50 uses S-LCI. In still other embodiments, the correlator module 50 uses a combination of LCI and S-LCI. However, in some embodiments, other time-domain integration methods and approaches may be used.

Details of the application of the FrFT to the correlated signal by the transform module 60 will also be described in detail below.

In some embodiments, the SRM module 70 comprises a phase dead reckoning (phase DR) module that determines super-resolution Doppler and phase values. Further description of such a phase DR module is provided below.

In other embodiments, the SRM module 70 comprises a maximum likelihood estimator (MLE). MLEs are well-known statistical methods for determining values that maximize the likelihood of a specific result in a particular probability distribution. In this case, the MLE determines error values and a pseudorange that maximize the probability of convergence between estimated rates and modelled reference rates. That is, the error values and pseudorange determined by the MLE comprise values that maximize the probability of convergence between the estimated Doppler rate, an estimated Doppler frequency, an estimated carrier phase, an estimated code phase, and an estimated signal amplitude, and the modelled Doppler rate, the modelled Doppler frequency, the modelled carrier phase, the modelled code phase, and the modelled signal amplitude, respectively. Further description of MLE-based implementations of the SRM module 70 is provided below.

Figure 2:
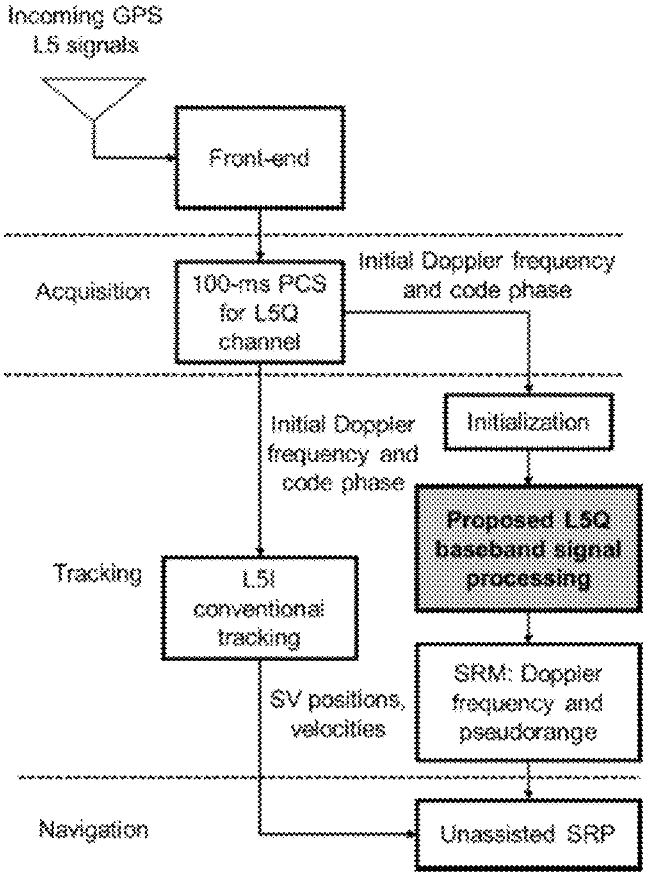
FIG. 2 is a process diagram of a phase-dead-reckoning- and super-resolution (SR)-Doppler-based tracking process for use by a receiver according to an embodiment of the invention.

One embodiment of the snapshot receiver 10 is shown in FIG. 2 (i.e., as a block diagram). This embodiment uses a phase-DR-based SRM module 70. The block denoted "Front-end" in this Figure corresponds to the receiving module 20 of FIG. 1. The block denoted "Proposed L5Q baseband signal processing" corresponds to the correlator module 50 and transform module 60 of FIG. 1. The block denoted "SRM: Doppler frequency and pseudorange" corresponds to the SRM module 70 of FIG. 1.

Figure 3:
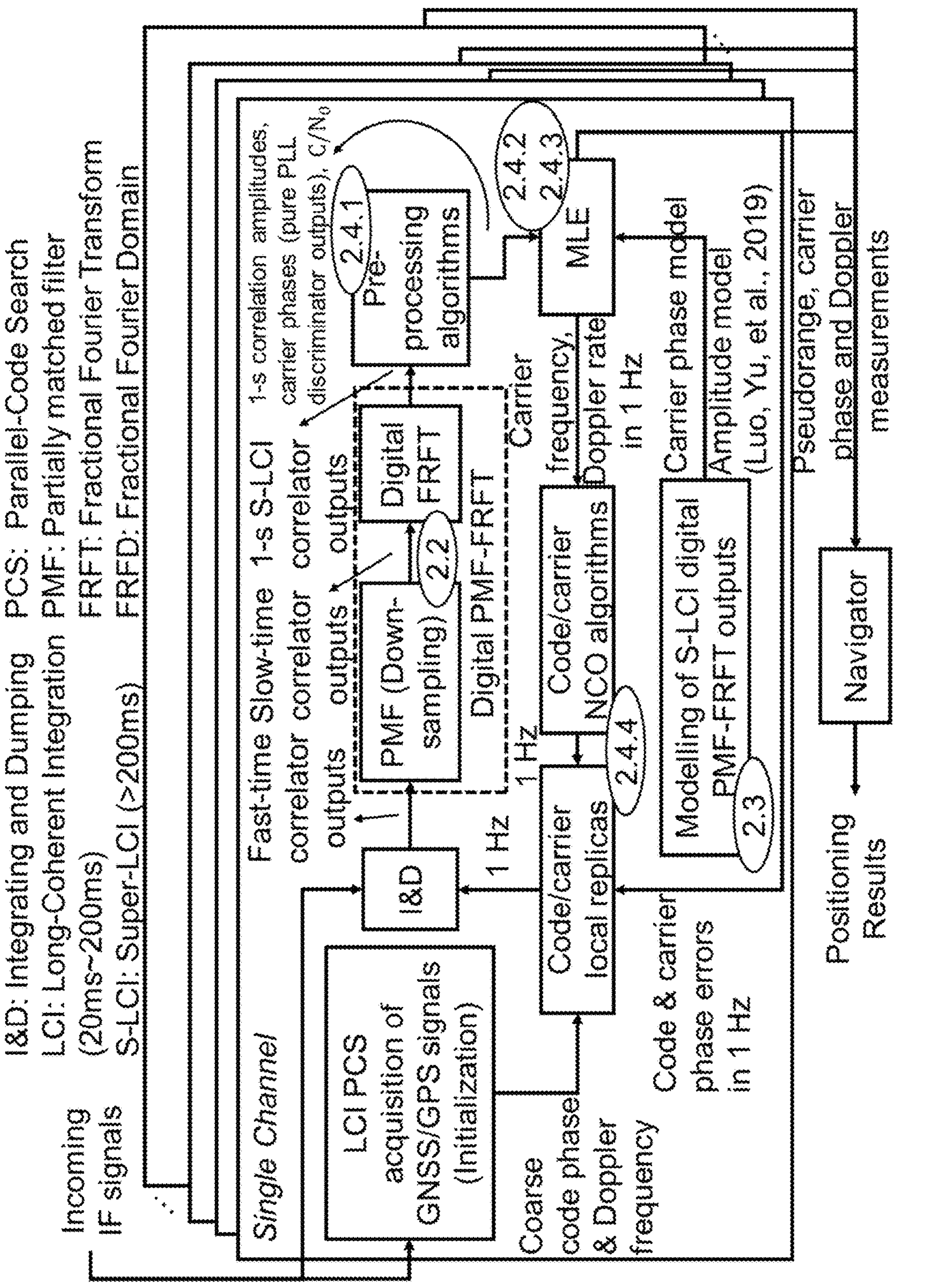
FIG. 3 is a process diagram of a maximum likelihood estimator (MLE)-based tracking process for use by a receiver according to an embodiment of the invention.

Another embodiment of the snapshot receiver 10 is shown in FIG. 3. This embodiment uses an MLE-based SRM module 70. As can be seen, the various modules of FIG. 1 can, in some embodiments, be embodied in separate and/or multiple elements of the receiver. For example, in this figure, the receiving module 20 is not explicitly shown. As a further example, as can be clearly seen, in this embodiment, the correlator module 50 comprises the initialization block on the left as well as the down-sampling submodule denoted as "PMF (Down-sampling)" in block 2.2. In this embodiment, the correlator module 50 first produces fast-time outputs. As will be further described below, the fast-time outputs are down-sampled by the down-sampling submodule to thereby produce slow-time outputs for use in S-LCI.

Further, as can be seen from FIG. 3, in some embodiments, the receiver 10 comprises a preprocessing module that preprocesses the estimated Doppler rate and Doppler shift after the FrFT is applied and before the SRM module 70 receives the transformed signal. Further, in some embodiments, the receiver 10 also comprises replication and feedback modules and submodules that create code/carrier local replicas based on the output of the SRM module 70. The code/carrier local replicas are, in some embodiments, fed back to the correlator module 50.

As well, as should be understood, the diagram shown in FIG. 3 details the receiver 10 in a single channel. As is well known, receivers may have a plurality of channels active at any time. As would be clear to the person skilled in the art, in the embodiment shown in FIG. 3, signals in each channel of the receiver 10 would be processed in an identical manner. The outputs of each channel are passed to the navigator module 80, which determines positioning information. Again, the outputs of each channel are the applicable pseudorange, carrier phase, and error values.

Again, the error values comprise the Doppler rate error, Doppler frequency error, the carrier phase error, the code phase error, and the signal amplitude error.

Similarly, in some embodiments, the correlator module 50 comprises a plurality of correlation channels. Each of the plurality of correlation channels performs a separate time-domain integration process on samples of the signal. Outputs of each separate channel are then merged to form the correlated signal for further processing within the processing module 40.

In some embodiments, the MLE applies the well-known gradient descent optimization process. Of course, other optimization processes are possible depending on the embodiment and implementation.

Mathematical Implementations and Approaches

A dynamic GNSS signal model may be used as a basis for understanding the various processes and description that follow. As should be understood, this model is intended to mimic the behaviour of an incoming GNSS signal. In particular, the model below models the intermediate frequency (IF) GPS L1 C/A signal, as follows:

$$s(t)=2(1+\Delta a)D\,(t-\tau_{PRN}+\tau_{dyn}(t))\;C\,(t-\tau_{PRN}+\tau_{dyn}(t))\times\cos\,(2\pi f_I t+(\phi_I+\phi_{dyn}(t)))$$

where $$\tau_{dyn}(t)\triangleq\left(vt+\frac{\beta}{2}t^2\right)c^{-1}$$

$$\phi_{dyn}(t)\triangleq 2\pi f_r\tau_{dyn}(t)\triangleq 2\pi\left(\mathrm{ft}+\frac{\mu}{2}t^2\right)$$

$$f\triangleq f_r c^{-1}v,\quad \mu\triangleq f_r c^{-1}\beta$$

$$\phi_I\triangleq\phi_0-\phi_{LO}-2\pi(f_r+f)\tau_{PRN}$$

and where $\Delta\alpha$ is the amplitude error of the baseband signal; t is the time variable; D(t) is the navigation data; C(t) is the spreading code; $f_i$ is the IF; $\phi_i$ is the initial carrier phase; $\tau_{PRN}$ is the propagation delay about the distance between the satellite and the user/receiver at the time of signal emission; $\tau_{dyn}(t)$ and $\phi_{dyn}(t)$ are the respective propagation delay residual and carrier phase residual determined by line-of-sight (LOS) dynamics and signal propagation time; $\nu$ is the dynamic term related to the velocity of the changing distance while $\beta$ is the counterpart related to acceleration; c is the speed of light; f is the initial Doppler frequency shift; $f_r$ is the radio frequency; $\mu$ is the Doppler rate; $\phi_0$ is the initial carrier phase; and $\phi_{LO}$ is the carrier phase caused by the frequency-mixing process.

Note as well that, in traditional GNSS baseband signal processing, the higher-order dynamic term $\beta$ related to the Doppler rate in $\tau_{dyn}(t)$ and $\phi_{dyn}(t)$ are not usually modelled. As a result, the local signal cannot be adequately replicated as the real signal, as higher-order dynamics cannot be considered. This has a greater impact for longer correlation periods: i.e., the longer the coherent integration interval is, the more apparent the discrepancy between the real signal and the local replica becomes.

Mathematical implementation details that follow referencing this signal model as needed. As should be understood, the mathematical implementations that follow are simply possible implementations. As described above and as known in the art, multiple approaches and methods may be suitable for each step.

Correlation and Digital Fractional Fourier Transform (FrFT)

Figure 4:
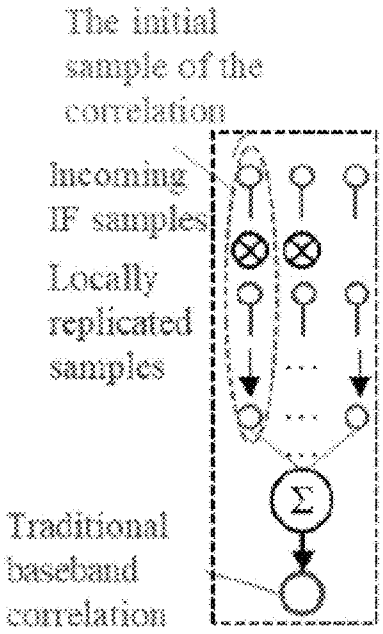
FIG. 4 is a diagram showing Sigma correlation according to the prior art.

Time-domain integration ("correlation") processes are well known. In general, the correlation processes comprise determining average values of a signal over preset time intervals. A diagram of traditional correlation processes in traditional GNSS tracking is shown in FIG. 4. An initial incoming IF signal is locally replicated. A plurality of samples and their corresponding local replicas are correlated together. It should be noted that FIG. 4 depicts three (3) samples; as would be understood by the person skilled in the art, the use of 3 samples in this figure is merely for visual simplicity. In practical cases, the actual sample number may be well into the thousands, if not higher. The averaged samples are summed to provide a single correlated output.

As is known in the art, LCI and S-LCI involve the use of large numbers of samples. In some embodiments of the present invention, the initial samples are further down-sampled to increase the number available for integration.

Figure 5:
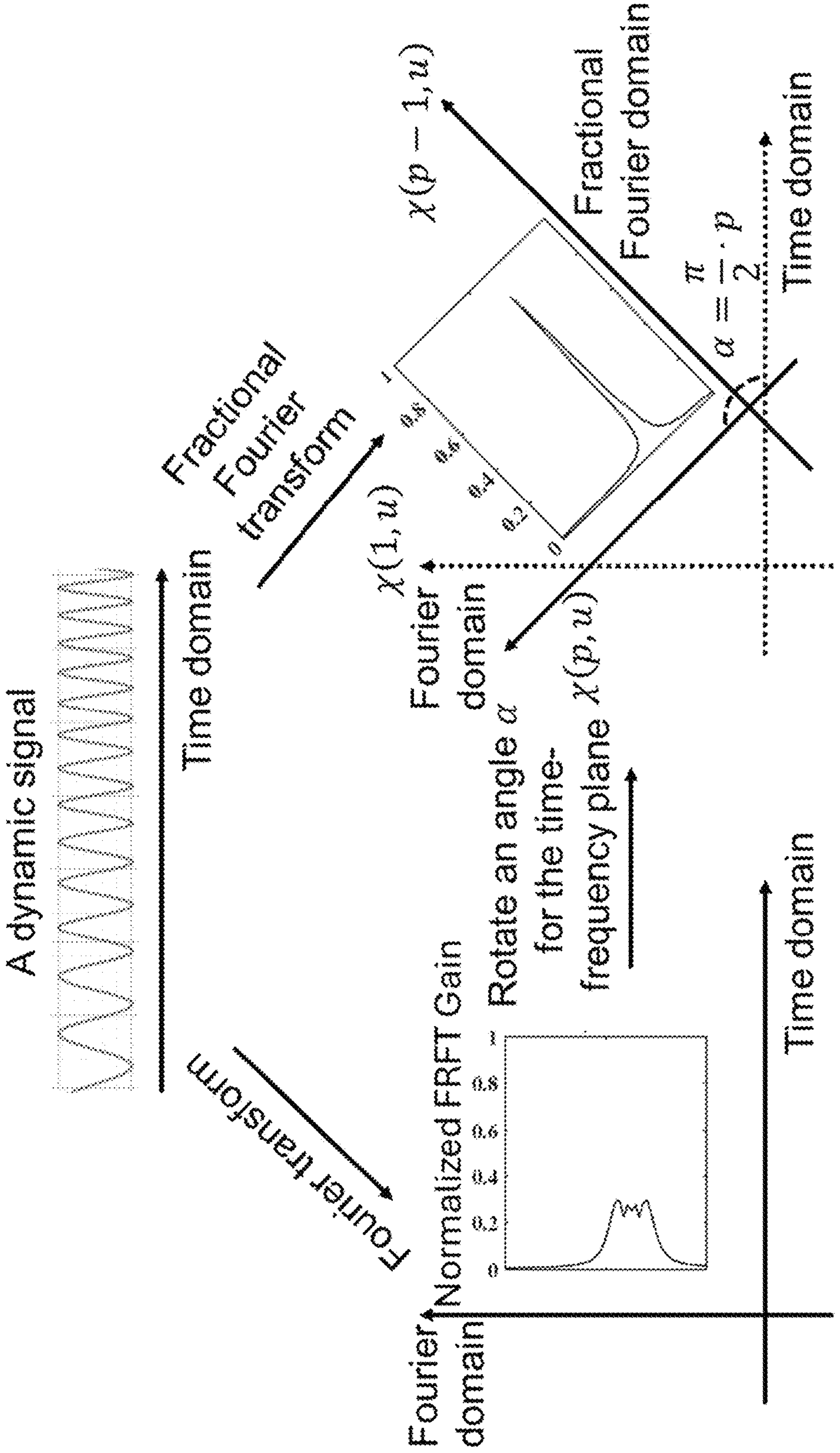
FIG. 5 is a schematic diagram showing conventional Fourier transforms and fractional Fourier transforms according to the prior art.

A diagram of FrFT, as compared to standard Fourier transforms (FTs), is shown in FIG. 5. The FrFT is a form of FT that is equivalent to the FT process when p is equal to 1. Assuming that the signal $\chi(t)$ satisfies Dirichlet conditions, the FrFT for $\chi(t)$ can be defined as an integral transform as follows:

$$\chi(p,u)=\int_{-\infty}^{\infty}\chi(t)K_p(t,u)dt$$

with $$K_p(t,u)=\begin{cases}C_\alpha e^{j\pi[(t^2+u^2)\cot\alpha-2ut\csc\alpha]} & \alpha\neq n\pi\\ \delta(t-u), & \alpha=2\pi n,\ n\in\mathbb{Z}\\ \delta(t+u), & \alpha=(2n+1)\pi\end{cases}$$

where $K_p(t, u)$ represents the transformation kernel of FRFT;

$$C_\alpha=\sqrt{1-j\cot\alpha};\ p$$

is the FrFT order; $\alpha$ denotes a rotation angle from the time-frequency plane in terms of the ordinary FT to an extended plane; and where $\alpha$ satisfies $$\alpha=\frac{\pi}{2}p$$

FIG. 5 shows that the ordinary FT transfers a dynamic signal from the time to frequency domain, but the signal power cannot be concentrated in this normal time-frequency plane. In contrast, after an FrFT, i.e., a rotation with an angle $\alpha$ for this plane, the dynamic signal power is concentrated in the FrFD (i.e., the fractional Fourier domain).

Figure 6:
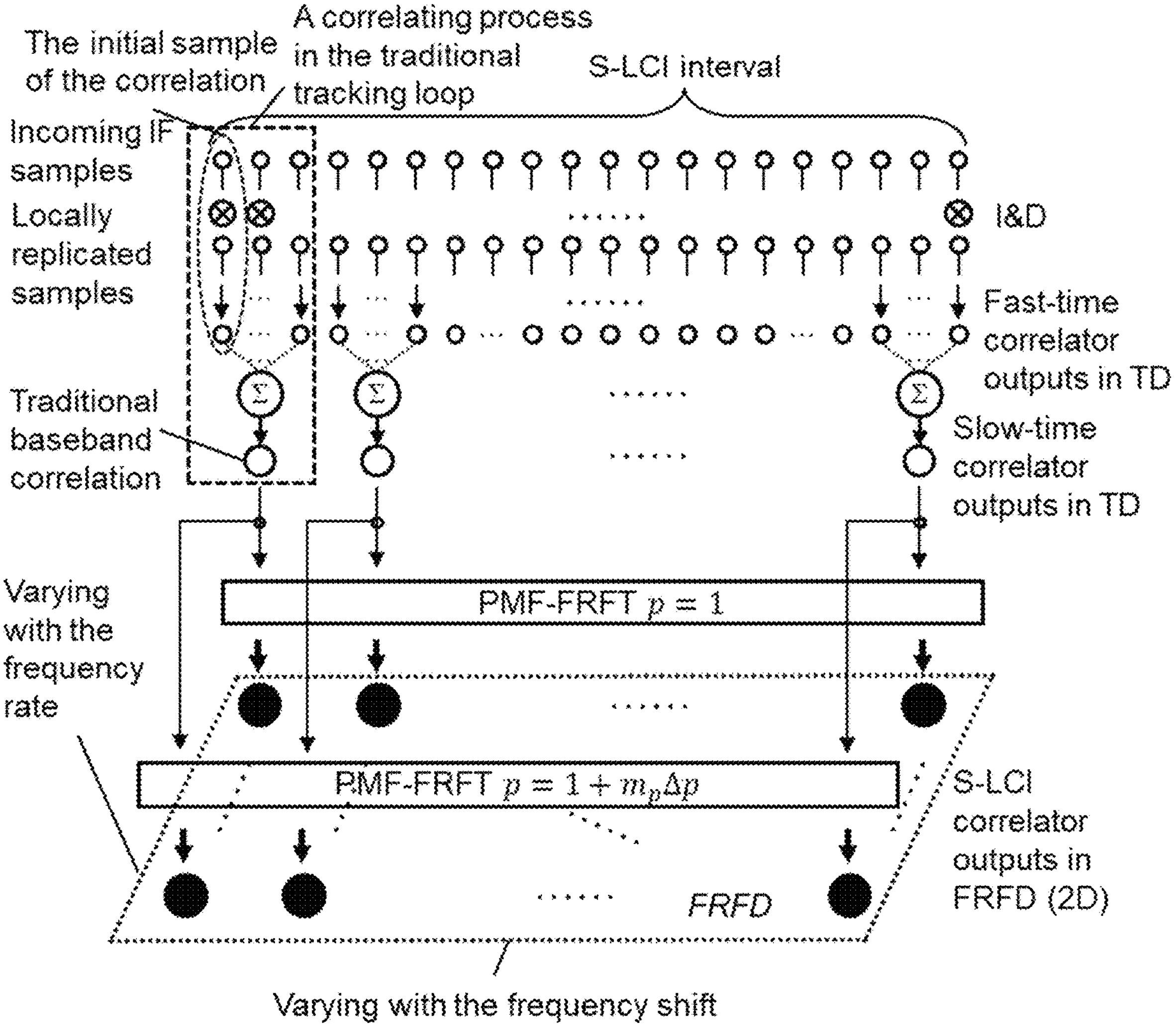
FIG. 6 is a diagram of a super-long coherent integration process with partially matched filtering-FrFT according to the present invention.

FIG. 6 illustrates the work process of the correlators based on the digital FrFT in the GNSS baseband, in some embodiments of the invention. (That is, in embodiments using S-LCI and multiple correlation channels.) As well, in the illustrated embodiment, a partially matched filter (PMF) technique is used for the digital FrFT to reduce computational burden. This is similar to the PMF-FFT (i.e., partially matched filter-fast Fourier transform) technique described in reference [9]. The input of the digital PMF-FrFT is slow-time correlations (the larger unfilled circles).

As can be seen, in the embodiment illustrated in FIG. 6, three types of correlator outputs are formed as follows:

First, a sequence of fast-time correlations (the smaller unfilled circles without extending line segments) is formed in the time domain (TD) after an integrating and dumping (I&D) module (a submodule of the correlator module 50) processes the incoming IF samples.

Second, a sequence of slow-time correlations is formed in the TD when the fast-time correlation sequence passes through the $N_s$-point summation operators. One summation process represents one PMF, and is a down-sampling process (i.e., performed by the down-sampling submodule). As is typical in GNSS tracking application, $N_s$ is much smaller than $N_t$, and the values satisfy $N_t=N_sP$, where P is the number of IF samples within one PMF and $N_s$ is the number of PMFs.

Third, a sequence of S-LCI correlations is formed in the FrFD after the PMF-FrFT processes the slow-time correlator outputs. Thus, compared to the original digital FrFT (i.e., without PMF processes), which has a computational load of $O(N_t \log_2 N_t)$, the digital PMF-FrFT process has a significantly lighter computational load of $O(N_s \log_2 N_s)$.

Closed-form models for the S-LCI correlations in the FrFD can then be derived as follows.

Closed-Form Models for the S-LCI Correlations in the FrFD

The expression for the sampled and digitalized s(t) in the dynamic GNSS model can be written as $$\begin{aligned} s(n_F T_F) &= D(n_F T_F - \tau_{PRN} + \tau_{dyn}(n_F T_F)) \\ &\times 2(1+\Delta a)C\ (n_F T_F - \tau_{PRN} + \tau_{dyn}(n_F T_F)) \\ &\times \cos\left(2\pi f_I n_F T_F + \left(\phi_I + 2\pi f n_F T_F + \pi\mu n_F^2 T_F^2\right)\right) \end{aligned}$$

where $n_F$ is the index of incoming IF samples; $T_F$ is the IF sampling interval; $s[n_F]$ indicates the sequence $s(n_F T_F)$; and, letting $\hat{s}[n_F, m_c, m_f]$ be the notation of the sequence of local replicas and $\chi^+[n_S, m_c, m_f]$ be the sequence of correlator outputs in the time-code-frequency domain (where $n_S$ is the index of the outputs, $m_c$ is the index of local code replica sequence about code chip offsets, and $m_f$ is the index of local carrier replica sequence about Doppler frequency offsets), the correlator outputs may be obtained by summing the outputs of the I&D operator between $s[n_F]$ and $\hat{s}[n_F, m_c, m_f]$, the expression of which is known as the cross-ambiguity function (CAF). The outputs of the I&D operator are herein referred to as the fast-time correlation sequence, while $\chi^+[n_S, m_c, m_f]$ is herein referred to as the slow-time correlation sequence.

The digital PMF-FrFT of the slow-time correlation sequence then gives $$x_b^+\left[m_c, m_f, m_{f_p}, m_p\right] = \frac{\sqrt{1 - j\ \cot(\alpha[m_p])}}{2\sqrt{N_S}} \times \sum_{n_s=-N_s}^{N_s} \chi^+\left[\frac{n_S}{2\sqrt{N_S}}, m_c, m_f\right]$$

$$e^{\left(j\pi\frac{\cot\ \alpha[m_p]m_u^2}{4N_S} - j\pi\frac{\csc\ \alpha[m_p]m_u n_S}{2N_S} + j\pi\frac{\cot\ \alpha[m_p]n_S^2}{4N_S}\right)} \text{ for } m_c = -\frac{M_c-1}{2}, \ldots,$$

$$\frac{M_c-1}{2}, m_f = -\frac{M_f-1}{2}, \ldots, m_{f_p} = -\frac{M_{f_p}-1}{2}, \ldots,$$

$$\frac{M_{f_p}-1}{2}, m_p = -\frac{M_p-1}{2}, \ldots, \frac{M_p-1}{2},$$

$$m_c, m_f, m_{f_p}, m_p \in \mathbb{Z}$$

with $$m_{f_p} \triangleq \frac{m_u}{2\sqrt{N_S}}$$

where $m_{f_p}$ and $m_p$ represent the indexes of the match filters for frequency shift and FrFT order (related to Doppler rate) in the FrFD, respectively; $\Delta p$ is the discrete search step for the FRFT order; and $M_c$, $M_f$, $M_{f_p}$ and $M_p$ are respectively the numbers of match filters in the CD, FD, FrFD (matching frequency shift), and FrFD (matching frequency rate).

Then, the matched frequency shift and rate in the FrFD is computed as $$f_{n_c}\left[m_{f_p}, m_p\right] = \frac{m_{f_p}}{N_S T_S \sin(\alpha[m_p])}$$

$$\mu[m_p] = -\frac{\cot(\alpha[m_p])}{N_S T_S^2}$$

where $$\alpha[m_p] = \frac{\pi}{2}(1 + m_p \Delta p)$$

and is the matched rotation angle.

The equation for $$\chi_b^+$$

can then be expressed as $$\begin{aligned} [\chi_b^+]_{m_c,m_f,m_{f_p},m_p} &= \sqrt{1 - j\ \cot(\alpha[m_p])}\, e^{j\pi\frac{f_{n_C}^2\left(\Delta f[m_f],\mu\mu\right)\cot(\alpha[m_p])}{N_S}} \\ &\times e^{j\phi_{n_C}(\Delta\phi, \Delta f[m_f], \mu)}\left|[\chi_b^+]_{m_c,m_f,m_{f_p},m_p}\right| \end{aligned}$$

with $$\phi_{n_C}(\Delta\phi, \Delta f[m_f], \mu) = \Delta\phi + \pi\Delta f[m_f]N_S T_S + \frac{\pi}{4}\mu N_S^2 T_S^2$$

$$f_{n_C}(\Delta f[m_f], \mu) = \Delta f[m_f] + \frac{\mu}{2}N_S T_S$$

$$\begin{aligned} \left|[\chi_b^+]_{m_c,m_f,m_{f_p},m_p}\right| &= R_\Sigma\left(\delta\tau_{b,m_c}(\Delta\tau_b), \Delta f[m_f], \mu\right) \\ &\times (1+\Delta a)\kappa_1^f(\Delta f[m_f], \mu) \\ &\times \kappa_2^f\left(\delta u_{m_{f_p}}, m_p, \Delta f[m_f], \mu\right) \\ &\times \kappa_2^\mu\left(\delta\mu_{m_p}(\mu)\right) \end{aligned}$$

$$\delta\tau_{b,m_c}(\Delta\tau_b) = \Delta\tau_b - \frac{m_c d_c}{2f_c}$$

$$\delta u_{m_{f_p},m_p}(\Delta f[m_f]) = \Delta f[m_f] - f_{n_C}\left[m_{f_p}, m_p\right]$$

$$\delta\mu_{m_p}(\mu) = \mu - \mu[m_p]$$

$$\Delta\phi = \phi_I - \hat{\phi}_I,\ \Delta\tau_b = \tau_{PRN} - \hat{\tau}_{PRN},\ \Delta f[m_f] = f - \left(\hat{f} + m_f\Delta f_{nco}\right)$$

where $\hat{\tau}_{PRN}$, $\hat{f}$ and $\hat{\phi}_I$ are, respectively, the estimated code delay in seconds, Doppler frequency in Hz, and carrier phase in radians from the NCO processes; $\Delta\tau_b$ and $\Delta\phi$ are the expressions of initial code phase error and initial carrier phase, respectively, $\Delta f[m_f]$ is the expression of initial frequency error about the NCO frequency; $f_c$ is the code frequency; $f_{n_c}(\Delta f[m_f], \mu)$ and $\phi_{n_c}(\Delta\phi, \Delta f\ [m_f],$ μ) are the closed-form expressions for the averaging frequency error and carrier phase over $T_r$; and $$|\chi_b^+|$$

is the closed-form correlation amplitude.

In summary, implementing digital PMF-FrFT to the slow-time correlation sequence gives the S-LCI correlation sequence varied with both matched frequency shift and rate in the FrFD. Thus, a 2D set of the S-LCI correlations in the FrFD is formed and can be written in a matrix as:

$$\begin{bmatrix} \chi_b^+\left[m_c, m_f, m_{fp} - \frac{M_{fp}-1}{2}, m_p - \frac{M_p - 1}{2}\right] & \cdots & \chi_b^+\left[m_c, m_f, m_{fp} + \frac{M_{fp}-1}{2}, m_p - \frac{M_p - 1}{2}\right] \\ \vdots & \ddots & \vdots \\ \chi_b^+\left[m_c, m_f, m_{fp} - \frac{M_{fp}-1}{2}, m_p + \frac{M_p - 1}{2}\right] & \cdots & \chi_b^+\left[m_c, m_f, m_{fp} + \frac{M_{fp}-1}{2}, m_p + \frac{M_p - 1}{2}\right] \end{bmatrix}$$

The S-LCI correlation sequences in the FrFD, i.e., after FrFT, can then be used by the SRM module 70 of the receiver 10.

SRM Module 70

The SRM module returns high-resolution error values based on the output(s) of the transform module. As described above, the SRM module 70, in some embodiments, comprises a phase dead reckoning ("phase DR") module. In other embodiments, the SRM module 70 comprises an MLE.

Phase DR Implementation

In implementations using super-resolution measurements, the closed-form models of the matched frequency shift error and rate can be written as $$\Delta f_{n_C}[\hat{m}_u', \hat{m}_p] = \frac{\hat{m}_u'}{N_S T_S \sin(\alpha[\hat{m}_p])}$$

$$\mu_{n_C}[\hat{m}_p] = -\frac{\cot(\alpha[\hat{m}_p])}{N_S T_S^2}$$

where $$\hat{m}_u' \triangleq \hat{m}_u / 2 / \sqrt{N_S}\,;\ \alpha[\hat{m}_p] = \frac{\pi}{2}(1 + \hat{m}_p \Delta p);$$

α is the matched rotation angle; and the subscript $n_C$ denotes the epoch index for the S-LCI correlations in the FrFD.

A frequency discriminator is used to reduce the estimated frequency error further, as $$\Delta\tilde{f}_{nC,disc} = \frac{\left(\Delta f_{n_C}[\hat{m}_u' - 1, \hat{m}_p]P_l + \Delta f_{n_C}[\hat{m}_u' \cdot \hat{m}_p]p_n + \Delta f_{n_C}[\hat{m}_u' + 1, \hat{m}_p]P_h\right)}{P_l + P_n + P_h}$$

with $$P_l = \left|\tilde{X}_b^+[m_u' - 1, \hat{m}_p]\right|^2,\ P_n = \left|\tilde{X}_b^+[m_u', \hat{m}_p]\right|^2,$$

$$P_h = \left|\tilde{X}_b^+[m_u' + l, \hat{m}_p]\right|^2$$

The matched code phase offset is modelled as $$\Delta\hat{\tau}_{n_s}[\hat{m}_c] \triangleq \tau_{n_s} - \left(\hat{\tau}_{n_S,0} + \frac{\hat{m}_c d_c}{2 f_c}\right)$$

and the carrier phase is discriminated by $$\Delta\hat{\phi}_{disc,n_C} = a\tan 2\left[\frac{\mathcal{J}\left(\hat{X}_b^+[\hat{m}_c, \hat{m}_u, \hat{m}_p]\right)}{\mathcal{R}\left(\hat{X}_b^+[\hat{m}_c, \hat{m}_u, \hat{m}_p]\right)}\right] - \arg\left[\sqrt{1 - j\cot(\alpha[\hat{m}_p])}\, e^{j\pi \frac{\Delta f_{n_C}^2\left(\Delta\hat{f}_0, \rho_0\right)\cot(\alpha[\hat{m}_p])}{N_S}}\right]$$

where $\Delta\hat{f}_0$ and $\hat{\mu}_0$ represent the initial frequency offset and Doppler rate estimates, respectively.

The carrier NCO frequency, in such an implementation, is then computed as $$\hat{f}_{\phi,NCO,n_C} = f_1 + \hat{f}_{n_C}$$

with $$\hat{f}_{n_C} = \hat{f}_{n_C - 1} + \mu_{n_C}[\hat{m}_p]\,T_t + \Delta f_{n_C}[\hat{m}_u' \cdot \hat{m}_p] + \Delta\hat{f}_{disc,n_C} + \Delta\hat{\phi}_{disc,n_C}$$

where $\hat{f}_{n_C}$ and $\hat{f}_{n_C - 1}$ are the estimated Doppler frequency in the current and previous S-LCI epochs, respectively.

The code NCO frequency is solely assisted by the carrier NCO frequency, to alleviate the multipath interference on the code phase estimates. As such, the code NCO frequency is given by $$\hat{f}_{\tau,NCO,n_C} = f_C + f_C \Delta\hat{\tau}_{n_C} - \frac{f_c}{f_r}\hat{f}_{n_C}$$

where $\Delta\hat{\tau}_{n_C}$ is the estimated code delay offset in the previous epoch and $f_r$ is the radio frequency (RF). Then, the code phase (which provides the pseudorange) is extracted via the code NCO frequency (which, as seen, is solely determined by the super-resolution carrier frequency). This is a code phase DR implementation through the integration of the super-resolution carrier frequency.

Doppler Frequency

The Doppler frequency measurement in an SRM-based embodiment is the averaging value over the current S-LCI interval, and can be obtained from $$\tilde{f}_{dop,n_C} = \hat{f}_{n_C}$$

Then, the matched Doppler rate can be used to estimate the instantaneous Doppler in the FrFD and the current Doppler measurement value. Hence, the instantaneous Doppler at the beginning of the $n_C$th epoch is computed as $$\hat{f}dop,\, n_{C,}0 = \tilde{f}dop,\, n_C - \frac{1}{2}\mu_{n_C} - 1\,[\hat{m}_p]\ T_t$$

Error values can be determined from the averaging Doppler rate, the instantaneous Doppler shift in the FrFD, and the current Doppler measurement value.

Pseudorange

For $n_S=0, \ldots, N_S-1$, $n_S \in \mathbb{Z}$,, the pseudorange measurements are computed through $$\tilde{\rho}^i_{n_S} = c\left(\hat{i}^i_{n_S} - \hat{\tau}^i_{rem,n_S} - \frac{\hat{f}^i_{\tau,NCO,n_C}}{f_C} T_S\right)$$

where $n_S$ is the index of the CAF samples since the S-LCI epoch $n_C+1$; the superscript i is the satellite number;

$$\hat{\tau}^i_{rem,n_S}$$

is the remained code delay in seconds at the previous epoch;

$$\hat{\tau}^i_{n_S}$$

is the local time count for the time-of-arrival (TOA) of satellite i, measured with a local oscillator.

The code NCO frequency value is unchangeable over the period between epoch $n_C+1$ and $n_C+2$; similarly, the carrier frequency is also unchanged over this period.

MLE Implementation

Figure 7:
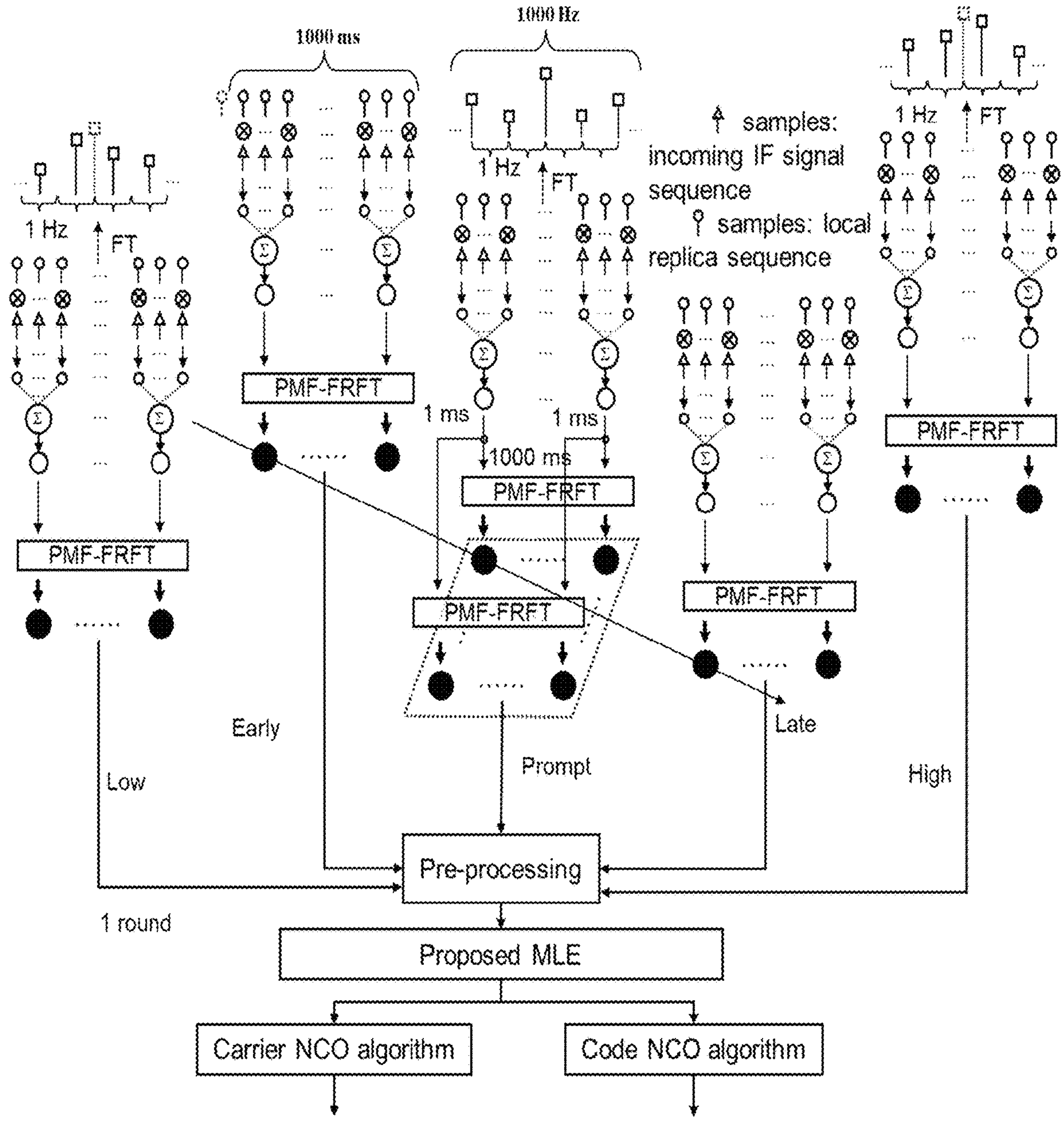
FIG. 7 is a diagram of processing stages in an MLE based implementation of the invention.

The following discusses a potential joint Doppler-effect/time-of-arrival (TOA) MLE for embodiments where the SRM module 70 is based on an MLE. A diagram of the process is shown in FIG. 7. As can be seen, 1000 slow-time correlation samples are generated (as described above) with the unchanged carrier and code NCO frequencies. Further, there are five correlator channels to process one satellite signal: besides the conventional early-, prompt-, and late-code delay channels, two extra channels (namely, low- and high-frequency channels) are also provided. Further, in the embodiment illustrated, a pre-processing process takes the place of the conventional code and carrier discriminators to process the correlator outputs from the five channels. Then, the joint Doppler effect/TOA MLE produces the final Doppler frequency error, carrier phase error, and the code phase error, to form the sources of GNSS measurements. As well, in the implementation depicted in FIG. 7, the slow-time interval was taken as 1 ms and a 1 s signal sequence was taken as an exemplary value. As should be understood, each of these parameters may be varied as considered suitable. For example, more or fewer than 1000 slow-time correlation samples may be generated, and more or fewer than 5 correlation channels may be used. The person skilled in the art would be able to identify suitable numbers of each. For clarity, it should be noted that the MLE implementation requires at least three channels, as follows: a frequency change channel for the frequency error estimation; a code phase/delay change channel for estimation of the code phase error; and a prompt channel, without frequency or code phase offsets, for estimating the Doppler rate with signal sequences based on the digital FRFT. The number of slow-time correlation samples may be any suitable number, from 1 up to the total number of IF sample points, which may be thousands or more. Of course, the person skilled in the art would understand that using very few slow-time correlation samples might not provide optimal results, while using very many slow-time correlation samples might create unnecessary computational burden.

Figure 8:
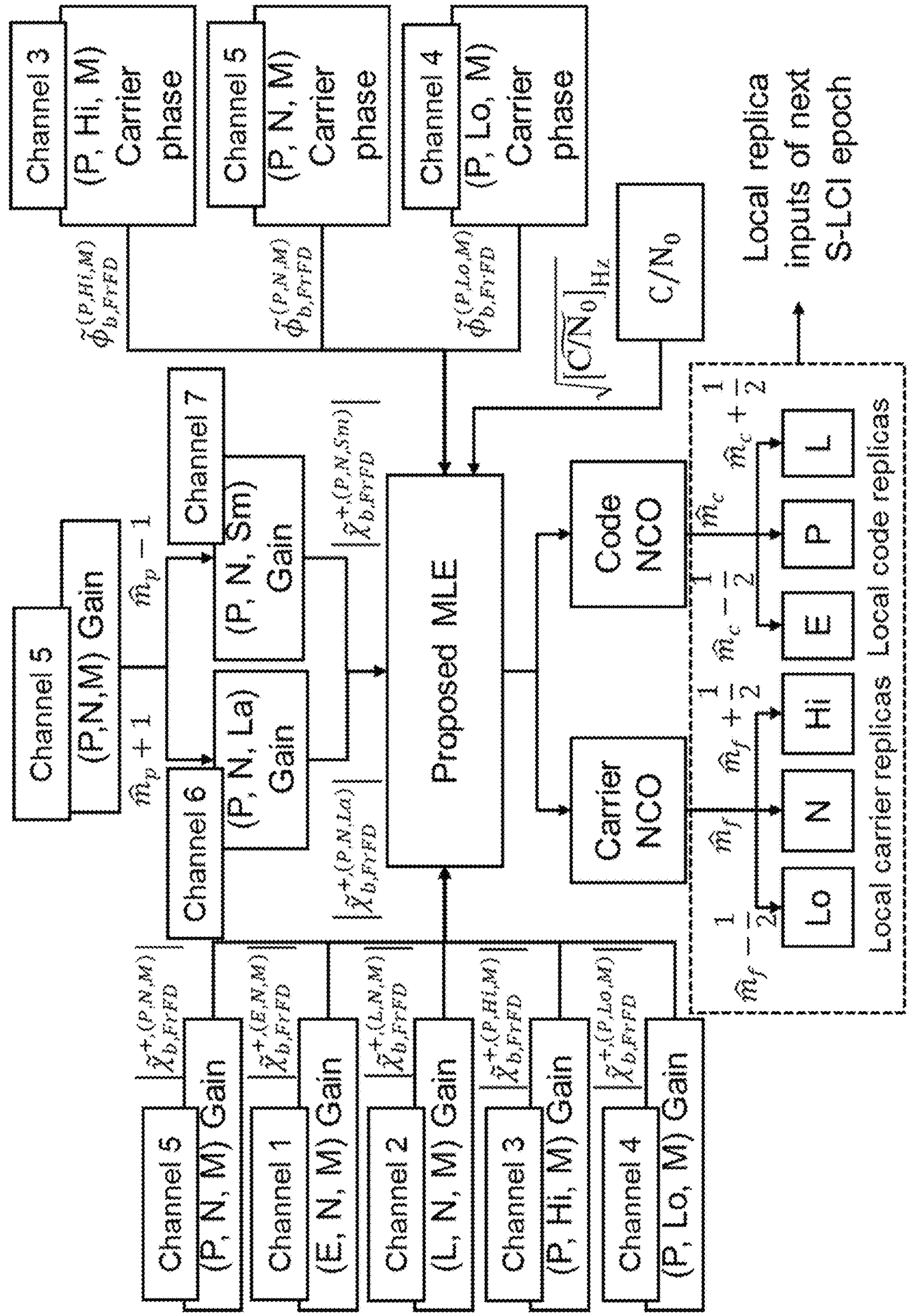
FIG. 8 is a diagram of a joint Doppler effect/time-of-arrival (TOA) MLE in the baseband, according to an embodiment of the invention.

Another diagram is of the joint Doppler effect/TOA MLE is shown in FIG. 8. A linearized system model of the MLE can be created, corresponding to this figure. The state vector is given by $$\theta \triangleq [\Delta\phi_C, \Delta\tau_{b,c}, \Delta f, \mu, \Delta\alpha]^T$$

with $$\Delta\phi_C \triangleq \frac{\Delta\phi}{2\pi},\ \Delta\tau_{b,c} \triangleq f_c\Delta\tau_b$$

The first three states represent initial carrier phase error in cycle, code phase error in chip, and Doppler frequency error in Hz, respectively. μ is the Doppler rate state in Hz/s, and Δα (gain) is the state of the normalized amplitude error.

The closed-form vector about the measurements of the MLE is defined as $$f(\theta) \triangleq \begin{bmatrix} f_{A0}(\Delta\tau_{b,c}, \Delta f, \mu \\ f_{A1}(\Delta\tau_{b,c}, \Delta f, \mu \\ f_{A2}(\Delta\tau_{b,c}, \Delta f, \mu \\ f_{A3}(\Delta\tau_{b,c}, \Delta f, \mu \\ f_B(\Delta\phi_c) \\ f_C(\Delta a) \end{bmatrix}$$

with $$f_{A0}(\Delta\tau_{b,c}, \Delta f, \mu) \triangleq \left|[\mathcal{X}_b^+]_{\hat{m}_c\hat{m}_f,\hat{m}_{f_p},\hat{m}_p}\right|$$

$$f_{A1}(\Delta\tau_{b,c}, \Delta f, \mu) \triangleq \left[\left|[\mathcal{X}_b^+]_{\hat{m}_c\hat{m}_f,\hat{m}_{f_p},\hat{m}_{p-1}}\right|, \left|[\mathcal{X}_b^+]_{\hat{m}_c\hat{m}_f,\hat{m}_{f_p},\hat{m}_{p+1}}\right|\right]^T$$

$$f_{A2}(\Delta\tau_{b,c}, \Delta f, \mu) \triangleq \left[\left|[\mathcal{X}_b^+]_{\hat{m}_c\hat{m}f-\frac{1}{2},\hat{m}_{f_p},\hat{m}_p}\right|, \left|[\mathcal{X}_b^+]_{\hat{m}_c\hat{m}f+\frac{1}{2},\hat{m}_{f_p},\hat{m}_p}\right|\right]^T$$

$$f_{A3}(\Delta\tau_{b,c}, \Delta f, \mu) \triangleq \left[\left|[\mathcal{X}_b^+]_{\hat{m}_c-\frac{1}{2},\hat{m}f\hat{m}_{f_p},\hat{m}_p}\right|, \left|[\mathcal{X}_b^+]_{\hat{m}_{c+}\frac{1}{2},\hat{m}_f\hat{m}_{f_p},\hat{m}_p}\right|\right]^T$$

$$f_B(\Delta\phi_C) \triangleq \left[\phi_{n_C}(\Delta\phi, \Delta f[\hat{m}_f], \mu),\ \phi_{n_C}\left(\Delta\phi, \Delta f\left[\hat{m}_f - \frac{1}{2}\right], \mu\right),\right.$$
$$\left.\phi_{n_C}\left(\Delta\phi, \Delta f\left[\hat{m}_f + \frac{1}{2}\right], \mu\right)\right]^T$$

-continued $$f_C(\Delta a) \triangleq \sqrt{[C/N_0]_{Hz}(\Delta a)} = \sqrt{\frac{(1+\Delta a)^2}{2\sigma_{N_S}^2 N_S T_S}}$$

where $$\sigma_{N_S}^2$$

is the noise variance of the in-phase/quadrature summations of the measured S-LCI correlation in a noise channel. In a typical baseband processing manner of radio signals, when the signal is tracked, the baseband signals consist of an in-phase component (primarily containing useful signal power) and a quadrature component (primarily containing noise power). So, in some cases, the noise variance can also be estimated from the quadrature component in the signal channel.

As the S-LCI correlation sequence is known to follow a Rayleigh distribution when there is no signal present in the signal processing channel, a noise channel or the quadrature component of a signal channel can be used to estimate the noise variance.

Then, as the unknown state vector is nonlinear with f(θ), the linearized form should be derived to allow the estimates to be updated in an iterative way, and is given by $$f(\theta) \approx f(\hat{\theta}_0) + \left.\frac{\partial f(\theta)}{\partial \theta^T}\right|_{\theta=\hat{\theta}_0} - \delta\theta$$

with $$\delta\theta = \theta - \hat{\theta}_0$$

where $\hat{\theta}_0$ denotes the initial guess (or the previous-epoch estimation) of the state vector. Then, the design matrix satisfies $$H \triangleq \left.\frac{\partial f(\theta)}{\partial \theta^T}\right|_{\theta=\hat{\theta}_0}$$

The measurement vector is given by $$\tilde{f} \triangleq \left[\tilde{f}_{A0}, \tilde{f}_{A1}^T, \tilde{f}_{A2}^T, \tilde{f}_{A3}^T, \tilde{f}_B^T, \tilde{f}_C^T\right]^T$$

with $$\tilde{f}_{A0} \triangleq \left|\tilde{X}_{b,FrFD}^{+,(P,N,M)}\right|$$

$$\tilde{f}_{A1} \triangleq \left[\left|\tilde{X}_{b,FrFD}^{+,(P,N,La)}\right|, \left|\tilde{X}_{b,FrFD}^{+,(P,N,Sm)}\right|\right]^T$$

$$\tilde{f}_{A2} \triangleq \left[\left|\tilde{X}_{b,FrFD}^{+,(P,Lo,M)}\right|, \left|\tilde{X}_{b,FrFD}^{+,(P,Hi,M)}\right|\right]^T$$

$$\tilde{f}_{A3} \triangleq \left[\left|\tilde{X}_{b,FrFD}^{+,(E,N,M)}\right|, \left|\tilde{X}_{b,FrFD}^{+,(L,N,M)}\right|\right]^T$$

$$\tilde{f}_B \triangleq \left[\tilde{\phi}_{b,FrFD}^{(P,N,M)}, \tilde{\phi}_{b,FrFD}^{(P,Lo,M)}, \tilde{\phi}_{b,FrFD}^{(P,Hi,M)}\right]^T$$

$$\tilde{f}_C \triangleq \sqrt{[\widetilde{C/N_0}]_{Hz}}$$

Gradient Descent Optimization

One embodiment of the MLE, as mentioned above, applies gradient descent optimization to determine the error values, carrier phase and pseudorange values. Gradient descent optimization is well-known and can be applied to the present context as follows.

Let $\hat{\theta}$ represent an estimate of the state vector θ with the measurement vector $\tilde{f}$. A loss function in terms of the S-LCI correlation amplitude (related to $\Delta\tau_{b,c}$, Δf, μ), the carrier phase (related to $\Delta\phi_c$) and the carrier-to-noise power density $C/N_0$ measurements (related to Δα) can be written as follows:

$$\text{Minimize: } J(\theta) = \left[f(\hat{\theta}) - \tilde{f}\right]^T C_s^{-1} \left[f(\hat{\theta}) - \tilde{f}\right]$$

where $C_s$ is the priori covariance matrix.

Then, that the optimization problem is unbiased and measurement noise is additive white Gaussian noise (AWGN), the minimization of the loss function is equivalent to maximizing the linearized joint likelihood function, as follows:

Maximize:

$$p_x(x;\theta) = \frac{1}{(2\pi)^{\frac{11}{2}} \det^{\frac{1}{2}}[C_5]} \times \exp\left[-\frac{1}{2}(x - s - H\delta\theta)^T C_s^{-1}(x - s - H\delta\theta)\right]$$

where det[·] is the determinant function; $x \triangleq \tilde{f}(\theta)$, $s \triangleq f(\hat{\theta}_0)$, and H is defined as above.

Maximizing with $$\frac{\delta \ln p_x(x;\theta)}{\delta\theta} = 0$$

gives an estimation for the MLE of $$\delta\hat{\theta} = \left(H^T C_s^{-1} H\right)^{-1} H^T C_s^{-1}(x - s)$$

with δθ as above.

The iterative estimation of the state vector is given by $$\hat{\theta} = \hat{\theta}_0 + \delta\hat{\theta}$$

Synthesized Carrier/Code NCO Frequencies and Carrier Phase/TOA Updates

As mentioned above, in some embodiments, local carrier/code NCO replicas are generated in by the processing module 40 and fed back to the correlator module 50. In some embodiments, these are created as follows:

$$\hat{f}_{\phi,NCO,n_C+1} = f_I + \hat{f}_{n_C+1}$$

$$\hat{f}_{\tau,NCO,n_C+1} = f_C - \frac{f_c}{f_r}\hat{f}_{n_C+1}$$

with $$\hat{f}_{n_C+1} = \hat{f}_{n_C} + \Delta\hat{f}_{n_C} + \gamma\hat{\mu}_{n_C} T_t$$

where subscript $n_C$ is the epoch index for a working snapshot receiver;

and are the estimated Doppler frequency, the estimated frequency error and the estimated Doppler rate respectively; and $\gamma$ is the coefficient for the Doppler rate estimation which may be determined based on empirical data.

Both the carrier and code phases of the local replicas are also directly adjusted by the estimated carrier and code phase errors as follows, $$\hat{\phi}_{0,n_C+1} = \hat{\phi}_{0,n_C} + 2\pi\left(\Delta\hat{\phi}_{c,n_C} + \Delta\hat{f}_{n_C}T_t + \frac{1}{2}\hat{\mu}_{n_C}T_t^2\right)$$

$$\hat{\tau}_{PRN,n_C+1} = \hat{\tau}_{PRN,n_C} + \frac{1}{f_c}\Delta\hat{\tau}_{b,c,n_C} = \frac{1}{f_r}\left(\Delta\hat{f}_{n_C}T_t + \frac{1}{2}\hat{\mu}_{n_C}T_t^2\right)$$

where $\Delta\hat{\phi}_{c,n_C}$ is the estimated carrier phase error and $\hat{\phi}_{0,n_C+1}$ and $\hat{\tau}_{PRN,n_C+1}$ are the updated carrier phase and TOA estimates.

Preprocessing

Figure 9:
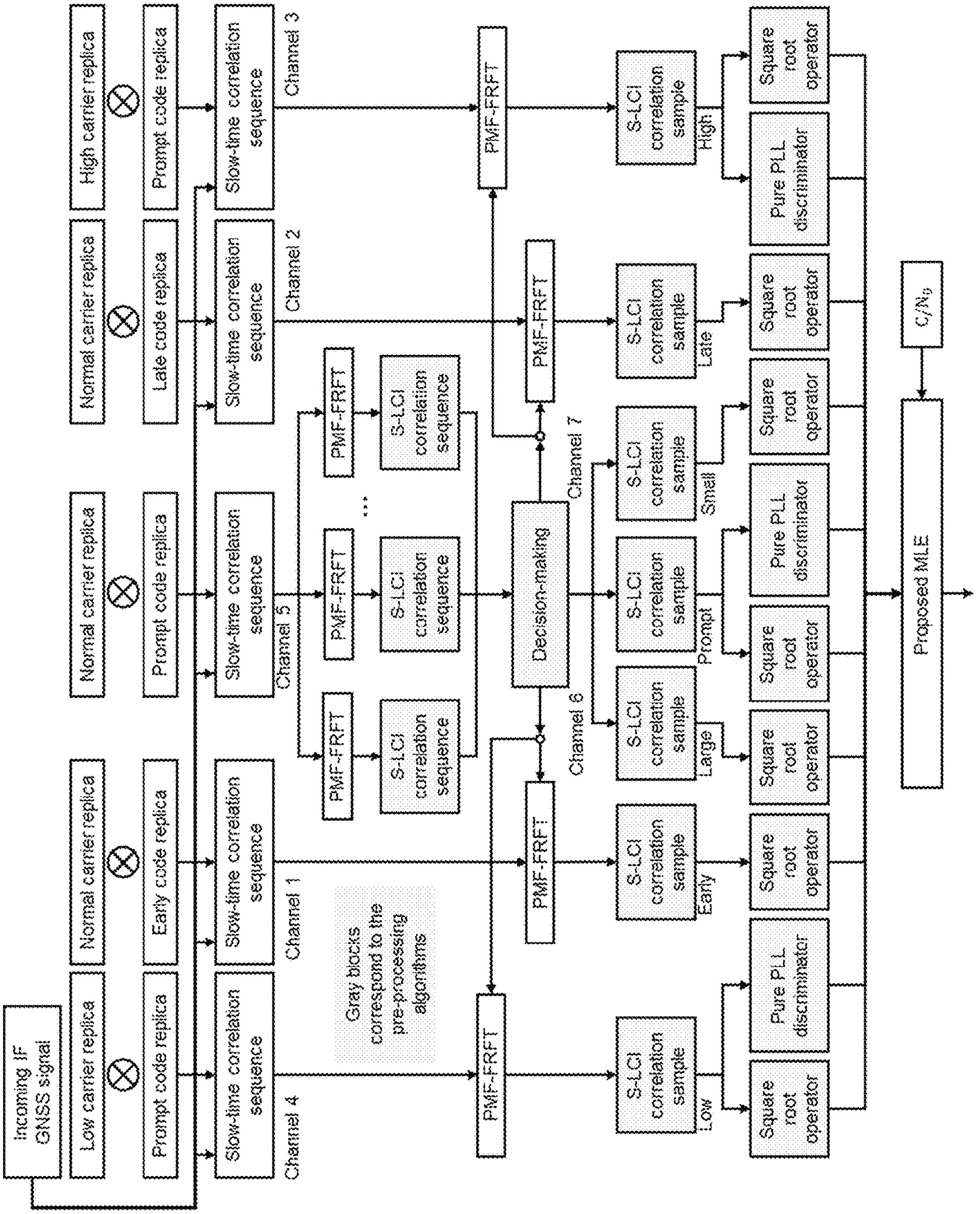
FIG. 9 is a diagram of pre-processing processes according to an embodiment of the present invention.

As mentioned above, in some embodiments, preprocessing is performed between the transform module 60 and the SRM module 70. One exemplary preprocessing process is illustrated in FIG. 9. As can be seen, the illustrated preprocessing process includes a "Decision-making" step. Before the Decision-making step, however, search steps for matching the code phase, frequency shift and rate should first be determined, to help produce non-singular and more accurate estimations ([10]). Rule-of-thumb early-late code and low-high frequency spacings are adopted: 0.5 chips and $2(3N_ST_S)^{-1}$ Hz, respectively, which provide the lowest tolerable correlating power peak. Similarly, the small-large rotation angle related to Doppler rate estimation is $\pi\Delta p_0$ where $\Delta p_0$ is an optimum search step of FrFT order.

Then, for $$N_{m_c} = \left\{x \,\middle|\, -\frac{1}{d_c} \le x \le \frac{1}{d_c}, x \in \mathbb{Z}\right\}$$

$$N_{m_f} = \left\{x \,\middle|\, -\frac{1}{T_t\Delta f_{nco}} \le x \le \frac{1}{T_t\Delta f_{nco}}, x \in \mathbb{Z}\right\}$$

$$N_{m_{fp}} = \left\{x \,\middle|\, -\frac{N_s}{2} \le x \le \frac{N_s}{2} - 1, x \in \mathbb{Z}\right\}$$

and $$N_{m_p} = \left\{x \,\middle|\, -\frac{1}{\Delta p_0} \le x \le \frac{1}{\Delta p_0}, x \in \mathbb{Z}\right\}$$

the decision-making process in the CD, FD, and FrFD are given by $$\left[\hat{m}_c, \hat{m}_f, \hat{m}_{f_p}, \hat{m}_p\right] = \underset{\substack{m_c \in N_{m_c}, m_f \in N_{m_f},\\ m_{f_p} \in N_{m_{f_o}}, m_p \in N_{m_p}}}{\operatorname{argmax}} \left\{\left|DF^p\left\{\tilde{\mathcal{X}}^+[n_s, m_c, m_f]\right\}\right|\right\}$$

where $DF^p\{\cdot\}$ is the digital operator of the FrFT process with respect to a FrFT order p and $$\tilde{\mathcal{X}}^+[n_S, m_c, m_f]$$

is the measured noisy $\chi^+[n_S, m_c, m_f]$ in the baseband.

Figure 10:
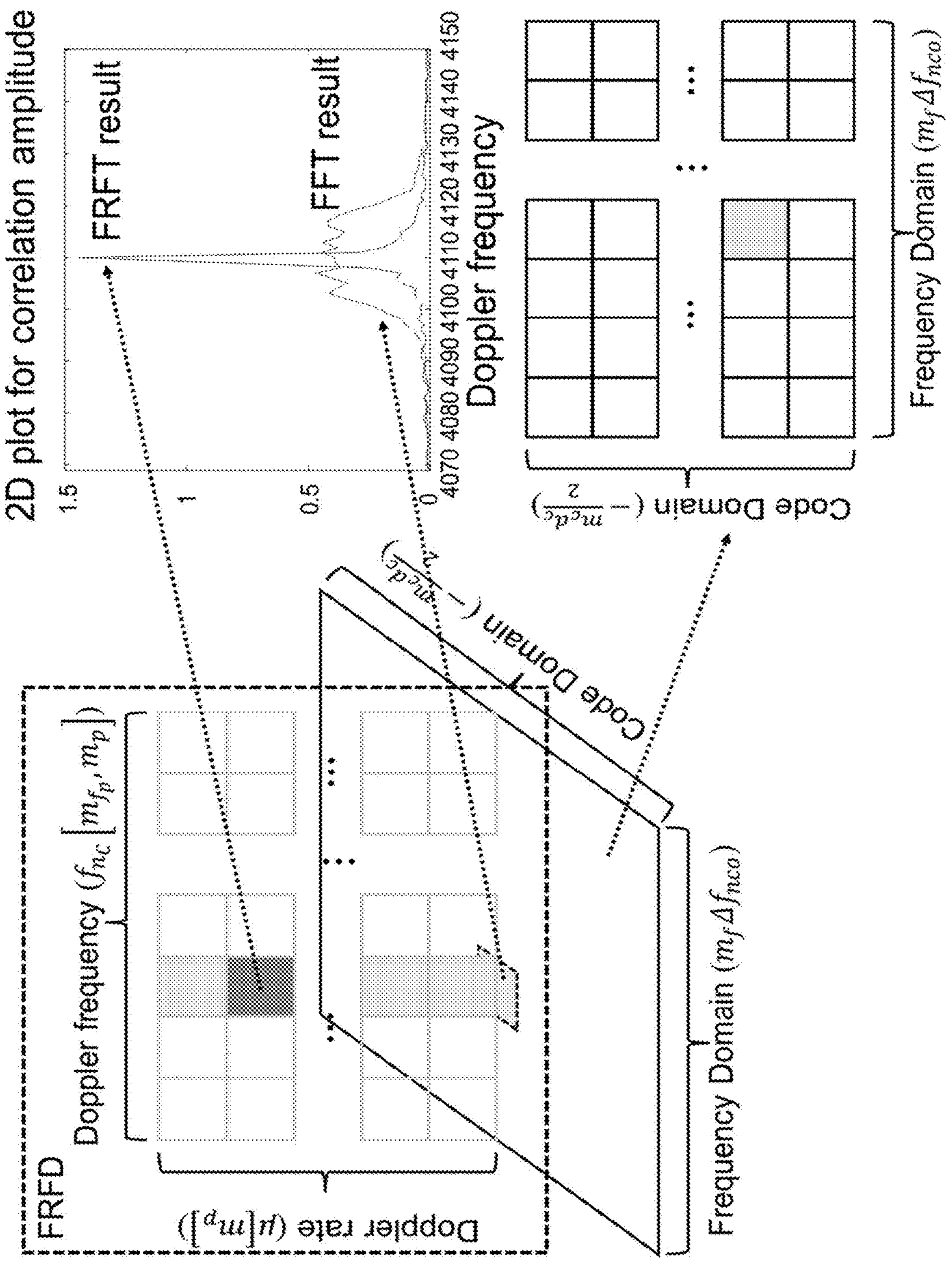
FIG. 10 is a diagram of matching filtering process up correlation peaks about the code domain (CD), frequency domain (FD), and fractional frequency domain (FrFD)

The matching process in the various domains is shown in FIG. 10.

The values of $$\hat{m}_c,$$

$$\hat{m}_f,$$

$$\hat{m}_{f_p}$$

and $$\hat{m}_p$$

are then conveyed to the early, late, low, and high channels. The measured S-LCI correlations from the prompt, early, late, low, and high channels are denoted as follows:

$$\text{Prompt} \rightarrow \tilde{X}_b^{+,P}\left[\hat{m}_c, \hat{m}_f, \hat{m}_{f_p}, \hat{m}_p\right]$$

$$\text{Early} \rightarrow \tilde{X}_b^{+,E}\left[\hat{m}_c, \hat{m}_f, \hat{m}_{f_p}, \hat{m}_p\right]$$

$$\text{Late} \rightarrow \tilde{X}_b^{+,L}\left[\hat{m}_c, \hat{m}_f, \hat{m}_{f_p}, \hat{m}_p\right]$$

$$\text{Low} \rightarrow \tilde{X}_b^{+,Lo}\left[\hat{m}_c, \hat{m}_f, \hat{m}_{f_p}, \hat{m}_p\right]$$

$$\text{High} \rightarrow \tilde{X}_b^{+,Hi}\left[\hat{m}_c, \hat{m}_f, \hat{m}_{f_p}, \hat{m}_p\right]$$

With $N_F$ as the IF sample number over $T_S$, the normalized amplitudes of each set of correlations are computable as:

$$|\tilde{X}_{b,FrFD}^{+(P,N,M)}| = \frac{1}{N_F\sqrt{N_S}}\sqrt{\mathcal{R}^2\left[\tilde{X}_b^{+,P}\left[\hat{m}_c, \hat{m}_f, \hat{m}_{f_p}, \hat{m}_p\right]\right] + \mathcal{J}^2\left[\tilde{X}_b^{+,P}\left[\hat{m}_c, \hat{m}_f, \hat{m}_{f_p}, \hat{m}_p\right]\right]}$$

$$|\tilde{X}_{b,FrFD}^{+(E,N,M)}| = \frac{1}{N_F\sqrt{N_S}}\sqrt{\mathcal{R}^2\left[\tilde{X}_b^{+,E}\left[\hat{m}_c, \hat{m}_f, \hat{m}_{f_p}, \hat{m}_p\right]\right] + \mathcal{J}^2\left[\tilde{X}_b^{+,E}\left[\hat{m}_c, \hat{m}_f, \hat{m}_{f_p}, \hat{m}_p\right]\right]}$$

$$|\tilde{X}_{b,FrFD}^{+(L,N,M)}| = \frac{1}{N_F\sqrt{N_S}}\sqrt{\mathcal{R}^2\left[\tilde{X}_b^{+,L}\left[\hat{m}_c, \hat{m}_f, \hat{m}_{f_p}, \hat{m}_p\right]\right] + \mathcal{J}^2\left[\tilde{X}_b^{+,L}\left[\hat{m}_c, \hat{m}_f, \hat{m}_{f_p}, \hat{m}_p\right]\right]}$$

$$|\tilde{X}_{b,FrFD}^{+(P,Lo,M)}| = \frac{1}{N_F\sqrt{N_S}}\sqrt{\mathcal{R}^2\left[\tilde{X}_b^{+,Lo}\left[\hat{m}_c, \hat{m}_f, \hat{m}_{f_p}, \hat{m}_p\right]\right] + \mathcal{J}^2\left[\tilde{X}_b^{+,Lo}\left[\hat{m}_c, \hat{m}_f, \hat{m}_{f_p}, \hat{m}_p\right]\right]}$$

$$|\tilde{X}_{b,FrFD}^{+(P,Hi,M)}| = \frac{1}{N_F\sqrt{N_S}}\sqrt{\mathcal{R}^2\left[\tilde{X}_b^{+,Hi}\left[\hat{m}_c, \hat{m}_f, \hat{m}_{f_p}, \hat{m}_p\right]\right] + \mathcal{J}^2\left[\tilde{X}_b^{+,Hi}\left[\hat{m}_c, \hat{m}_f, \hat{m}_{f_p}, \hat{m}_p\right]\right]}$$

The S-LCI correlations related to small and large (rotation angles) channels come from the outputs of the digital PMF-FrFT in the prompt channel, and the related amplitudes are calculated as $$|\tilde{\mathcal{X}}_{b,FrFD}^{+(P,N,Sm)}| = \frac{1}{N_F\sqrt{N_S}} \times \sqrt{\mathcal{R}^2\left[\tilde{\mathcal{X}}_b^{+,P}\left[\hat{m}_c, \hat{m}_f, \hat{m}_{f_p}, \hat{m}_p - 1\right]\right] + \mathcal{J}^2\left[\tilde{\mathcal{X}}_b^{+,P}\left[\hat{m}_c, \hat{m}_f, \hat{m}_{f_p}, \hat{m}_p - 1\right]\right]}$$

$$|\tilde{\mathcal{X}}_{b,FrFD}^{+(P,N,La)}| = \frac{1}{N_F\sqrt{N_S}} \times \sqrt{\mathcal{R}^2\left[\tilde{\mathcal{X}}_b^{+,P}\left[\hat{m}_c, \hat{m}_f, \hat{m}_{f_p}, \hat{m}_p + 1\right]\right] + \mathcal{J}^2\left[\tilde{\mathcal{X}}_b^{+,P}\left[\hat{m}_c, \hat{m}_f, \hat{m}_{f_p}, \hat{m}_p + 1\right]\right]}$$

The carrier phase measurements for the respective normal, low, and high (frequency) channels are calculated through a four-quadrant arctangent/pure PLL discriminator as follows:

$$\tilde{\phi}_{b,FrFD}^{P,N,M)} = a\tan 2\left[\mathcal{J}\left[\tilde{\mathcal{X}}_b^{+,P}\left[\hat{m}_c, \hat{m}_f, \hat{m}_{f_p}, \hat{m}_p\right]\right], \mathcal{R}\left[\mathcal{X}_b^{+,P}\left[\hat{m}_c, \hat{m}_f, \hat{m}_{f_p}, \hat{m}_p\right]\right]\right] - \arg\left[\sqrt{1 - j\cot(\alpha[\tilde{m}_p])}\, e^{j\pi\frac{f_{n_C}^2\left(\Delta\hat{f}_o, \hat{u}_0\right)\cot(\alpha[\tilde{m}_p])}{N_S}}\right]$$

$$\tilde{\phi}_{b,FrFD}^{P,Lo,M)} = a\tan 2\left[\mathcal{J}\left[\tilde{\mathcal{X}}_b^{+,Lo}\left[\hat{m}_c, \hat{m}_f, \hat{m}_{f_p}, \hat{m}_p\right]\right], \mathcal{R}\left[\mathcal{X}_b^{+,Lo}\left[\hat{m}_c, \hat{m}_f, \hat{m}_{f_p}, \hat{m}_p\right]\right]\right] - \arg\left[\sqrt{1 - j\cot(\alpha[\tilde{m}_p])}\, e^{j\pi\frac{f_{n_C}^2\left(\Delta\hat{f}_0 - \frac{1}{2}\Delta f_{nco}, \hat{\mu}_0\right)\cot(\alpha[\tilde{m}_p])}{N_S}}\right]$$

$$\tilde{\phi}_{b,FrFD}^{P,Hi,M)} = a\tan 2\left[\mathcal{J}\left[\tilde{\mathcal{X}}_b^{+,Hi}\left[\hat{m}_c, \hat{m}_f, \hat{m}_{f_p}, \hat{m}_p\right]\right], \mathcal{R}\left[\mathcal{X}_b^{+,Hi}\left[\hat{m}_c, \hat{m}_f, \hat{m}_{f_p}, \hat{m}_p\right]\right]\right] - \arg\left[\sqrt{1 - j\cot(\alpha[\tilde{m}_p])}\, e^{j\pi\frac{f_{n_C}^2\left(\Delta\hat{f}_0 + \frac{1}{2}\Delta f_{nco}, \hat{\mu}_0\right)\cot(\alpha[\tilde{m}_p])}{N_S}}\right]$$

where $$\Delta\hat{f}_0$$

and $$\hat{\mu}_0$$

respectively, represent the initial frequency error and Doppler rate estimates.

A measured carrier-to-noise ratio density $[\widetilde{C/N_0}]_{Hz}$ related to the incoming signal amplitude is also used in the MLE. In practice, this value can be obtained from previous-epoch measurements, empirical models, etc.

Flowcharts

Figure 11:
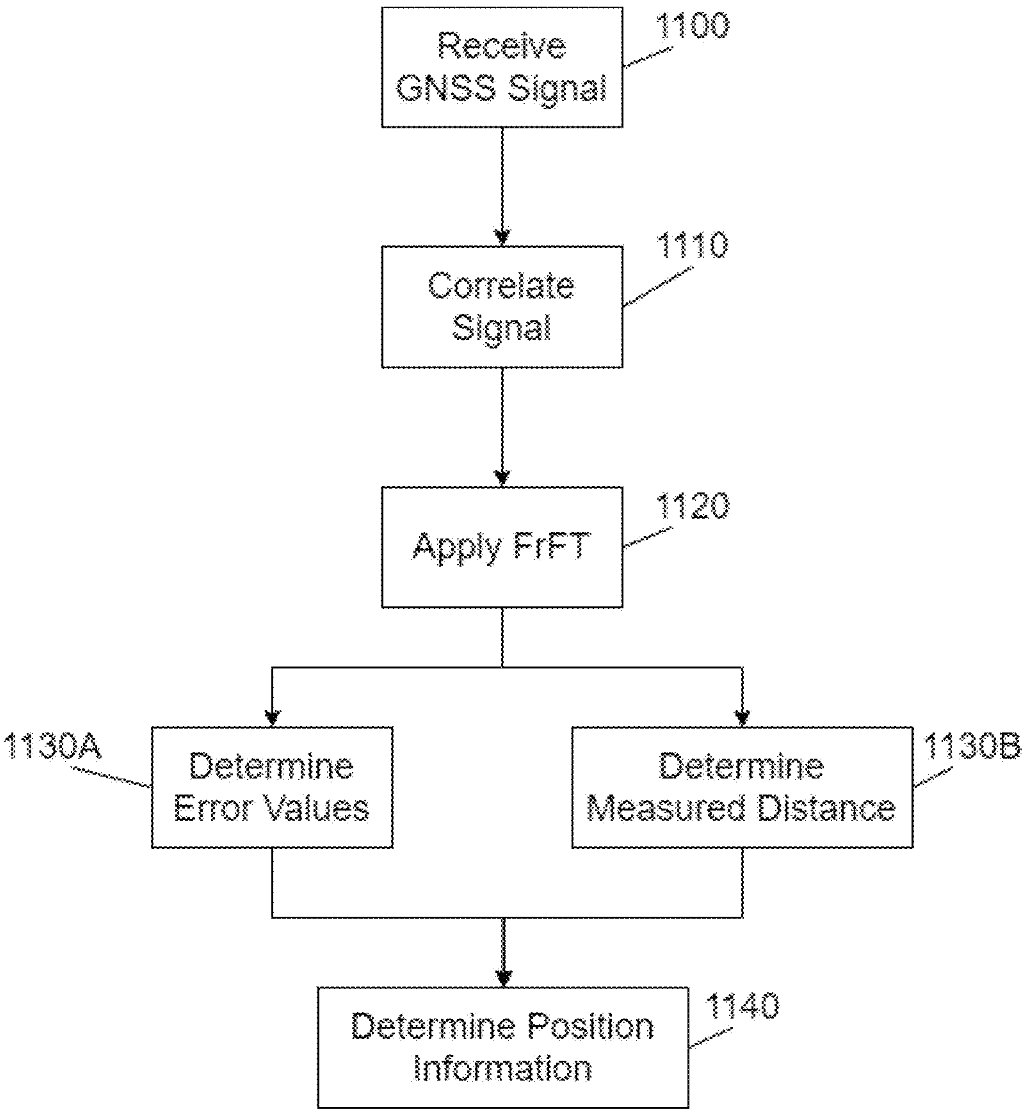
FIG. 11 is a flow chart detailing a method according to one aspect of the invention.

FIG. 11 is a flowchart detailing a method according to one aspect of the invention. At step 1100, a GNSS signal is received. At step 1110, the signal is correlated as detailed above. At step 1120, a fractional Fourier transform (FrFT) is applied. At steps 1130A and 1130B, error values of an estimated Doppler rate and a measured distance ("pseudorange") between the relevant receiver and a satellite transmitting the GNSS signal are determined. Once these values are determined (e.g., via Phase DR computations or a joint Doppler/TOA MLE, etc), the position information is determined at step 1140.

As noted above, for a better understanding of the present invention, the following references may be consulted. Each of these references is hereby incorporated by reference in its entirety:

[1] Dierendonck, A. J. Van. (1996). GPS Receivers. In B. W. Parkinson, J. J. Spilker Jr, P. Axelrad, & P. Enge (Eds.), *Global Positioning System: Theory and Applications, Volume* 1. American Institute of Aeronautics and Astronautics, Inc.

[2] Lashley, M., Bevly, D. M., & Hung, J. Y. (2009). Performance analysis of vector tracking algorithms for weak GPS signals in high dynamics. *IEEE Journal on Selected Topics in Signal Processing,* 3(4), 661-673. https://doi.org/10.1109/JSTSP.2009.2023341

[3] Pany, T., & Eissfeller, B. (2006). Use of a Vector Delay Lock Loop Receiver for GNSS Signal Power Analysis in Bad Signal Conditions. 2006 *IEEE/ION Position, Location, And Navigation Symposium,* 2006, 893-903. https://doi.org/10.1109/PLANS.2006.1650689

[4] Maier, D. S., & Pany, T. (2021). Multipath and Attitude Estimation Phase Lock Loop for Antenna Array Signal Processing. *In proceedings of ION GNSS*+2021, pp. 3402-3421. https://doi.org/10.33012/2021.17979

[5] Gowdayyanadoddi, N. S., Broumandan, A., Curran, J. T., and Lachapelle, G., "Benefits of an ultra stable oscillator for long coherent integration," in *Proceedings of the 27th International Technical Meeting of The Satellite Division of the Institute of Navigation* (ION GNSS+2014), 2014, pp. 1578-1594.

[6] Soloviev, A. and Dickman, J. "Extending GPS carrier phase availability indoors with a deeply integrated receiver architecture," *IEEE Wireless Communications,* Vol. 18, No. 2, pp. 36-44, April 2011. [Online]. Available: http://ieeexplore.ieee.org/document/5751294/[7]

[7] Faragher, R., Powe, M., Esteves, P., Couronneau, N., Crockett, M., Martin, H., Ziglioli, E., and Higgins, C., "Supercorrelation as a Service: S-GNSS Upgrades for Smartdevices," *in Proceedings of the 32nd International Technical Meeting of the Satellite Division of The Institute of Navigation* (ION GNSS+2019), September 16-20, Miami, Florida, USA, 2019.

[8] Groves, P. D., Zhong, Q., Faragher, R., and Esteves, P., "Combining Inertially-aided Extended Coherent Integration (Supercorrelation) with 3D-Mapping-Aided GNSS," in *Proceedings of the 33rd International Technical Meeting of the Satellite Division of The Institute of Navigation* (ION GNSS+2020), September 2020, pp. 2327-2346.

[9] Stirling-Gallacher, R. A., Hulbert, A. P., & Povey, G. J. R. (1996). A fast acquisition technique for a direct sequence spread spectrum signal in the presence of a large Doppler shift. *Proceedings of ISSSTA '95 International Symposium on Spread Spectrum Techniques and Applications,* 1, 156-160. https://doi.org/10.1109/ISSSTA.1996.563761

[10] Li, X., & Pahlavan, K. (2004). Super-Resolution TOA Estimation With Diversity for Indoor Geolocation. *IEEE Transactions on Wireless Communications,* 3(1), 224-234. https://doi.org/10.1109/TWC.2003.819035

[11] Ozaktas, H. M., Arikan, O., Kutay, M. A., & Bozdagt, G. (1996). Digital computation of the fractional Fourier transform. *IEEE Transactions on Signal Processing,* 44(9), 2141-2150.

[12] Luo, Y., Li, J., Yu, C., Lyu, Z., Yue, Z., & El-Sheimy, N. (2019). A GNSS software-defined receiver with vector tracking techniques for land vehicle navigation. *Proc. ION* 2019 *Pacific PNT Meeting*, Honolulu, Hawaii, USA, Apr. 8-11, 2019-April, 713-727. https://doi.org/10.33012/2019.16834

[13] Luo, Y., Yu, C., Chen, S., Li, J., Ruan, H., & El-Sheimy, N. (2019). A Novel Doppler Rate Estimator Based on Fractional Fourier Transform for High-Dynamic GNSS Signal. IEEE Access, 7, 29575-29596. https://doi.org/10.1109/ACCESS.2019.2903185

[14] Luo, Y., Yu, C., Xu, B., Li, J., Tsai, G.-J., Li, Y., & El-Sheimy, N. (2019). Assessment of Ultra-Tightly Coupled GNSS/INS Integration System towards Autonomous Ground Vehicle Navigation Using Smartphone IMU. 2019 *IEEE International Conference on Signal, Information and Data Processing* (*ICSIDP*), 1-6. https://doi.org/10.1109/ICSIDP47821.2019.9173292

[15] Luo, Y., Zhang, L., & El-Sheimy, N. (2018). An improved DE-KFL for BOC signal tracking assisted by FRFT in a highly dynamic environment. 2018 IEEE/ION Position, Location and Navigation Symposium, PLANS 2018-Proceedings, 1525-1534. https://doi.org/10.1109/PLANS.2018.8373547

[16] Luo, Y., Zhang, L., & Ruan, H. (2018). An Acquisition Algorithm Based on FRFT for Weak GNSS Signals in A Dynamic Environment. IEEE Communications Letters, 22(6), 1212-1215. https://doi.org/10.1109/LCOMM.2018.2828834

As used herein, the expression "at least one of [x] and [y]" means and should be construed as meaning "[x], [y], or both [x] and [y]".

It should be clear that various aspects of the present invention may be implemented as software modules in an overall software system. As such, some aspects of the present invention may thus take the form of computer executable instructions that, when executed, implements various software modules with predefined functions.

Similarly, some embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Such embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Further, some embodiments can be implemented as a computer program product for use with a computer system and GNSS device(s). Such implementations may comprise a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A snapshot receiver for determining position information, said snapshot receiver comprising:

a receiver configured to receive a GNSS signal from a satellite, said GNSS signal having at least one quality issue;

a correlator configured to correlate said GNSS signal using time-domain integration of a plurality of samples of said GNSS signal, to thereby produce a correlated signal;

a transformer configured to apply a Fractional Fourier Transform (FrFT) process to said correlated signal to thereby produce an estimated Doppler rate; and a super-resolution measurement (SRM) unit configured to receive the estimated Doppler rate, determine error values of said estimated Doppler rate, and determine a distance between said snapshot receiver and said satellite, based on said estimated Doppler rate; and a navigator configured to determine said position information based on said error values and said distance, said position information detailing a geographic position of said snapshot receiver, and said position information being an output of said snapshot receiver, wherein said at least one quality issue is at least one of signal interruption, signal attenuation, and non-line-of-sight (NLOS) interference, and wherein said correlating and said FrFT process compensate for said at least one quality issue in said GNSS signal.

2. The snapshot receiver according to claim 1, wherein said SRM unit comprises a phase dead reckoning unit for determining said error values and said measured distance.

3. The snapshot receiver according to claim 1, wherein said SRM unit comprises a maximum likelihood estimator (MLE) for determining said error values and said measured distance, wherein said error values and said measured distance are values that maximize a probability of convergence between said estimated Doppler rate and a modelled reference Doppler rate.

4. The snapshot receiver according to claim 3, wherein said MLE applies a gradient descent optimization process when determining said error values and said measured distance.

5. The snapshot receiver according to claim 1, wherein said error values comprise a Doppler rate error, a Doppler frequency error, a carrier phase error, and a code phase error of said estimated Doppler rate.

6. The snapshot receiver according to claim 1, wherein said correlator comprises a plurality of correlation channels.

7. The snapshot receiver according to claim 1, wherein said correlator applies super-long coherent integration (S-LCI).

8. The snapshot receiver according to claim 1, wherein:

said transform unit comprises a down-sampling subunit;

said correlated signal comprises fast-time correlator outputs;

said down-sampling subunit down-samples said fast-time correlator outputs to thereby produce slow-time correlator outputs; and said FrFT is applied to said slow-time correlator outputs.

9. The snapshot receiver according to claim 1, wherein said estimated Doppler rate is passed through a pre-processing unit before being passed to the SRM module.

10. A method for determining position information, said method comprising the steps of:

receiving a GNSS signal from a satellite at a snapshot receiver, said GNSS signal having at least one quality issue;

at a processor of said snapshot receiver:

correlating said GNSS signal using time-domain integration of a plurality of samples of said GNSS signal, to thereby produce a correlated signal;

applying a Fractional Fourier Transform (FrFT) process to said correlated signal to thereby produce an estimated Doppler rate, wherein said estimated Doppler rate has an associated probability distribution; and determining error values of said estimated Doppler rate;

based on the estimated Doppler rate, determining a distance between said snapshot receiver and said satellite; and determining said position information based on said error values and said measured distance, said position information detailing a geographic position of said snapshot receiver, and said position information being an output of said snapshot receiver, wherein said at least one quality issue is at least one of signal interruption, signal attenuation, and non-line-of-sight (NLOS) interference, and where said correlating and said FrFT process compensate for said at least one quality issue in said GNSS signal.

11. The method according to claim 10, wherein determining said error values and said measured distance uses a dead-reckoning phase based on the estimated Doppler rate.

12. The method according to claim 10, wherein determining said error values and said measured distance uses maximum likelihood estimation (MLE), such that said error values and said measured distance are values that maximize a probability of convergence between said estimated Doppler rate, an estimated Doppler frequency, an estimated carrier phase, an estimated code phase, an estimated signal amplitude, and a modelled reference Doppler rate, a modelled Doppler frequency, a modelled carrier phase, a modelled code phase, and a modelled signal amplitude, respectively.

13. The method according to claim 12, wherein said MLE applies a gradient descent optimization process when determining said error values and said measured distance.

14. The method according to claim 10, wherein said error values comprise a Doppler rate error, a Doppler frequency error, a carrier phase error, and a code phase error of said estimated Doppler rate.

15. The method according to claim 10, wherein a plurality of correlation channels are used in said step of correlating.

16. The method according to claim 10, wherein said time-domain integration is super-long coherent integration (S-LCI).

17. The method according to claim 10, wherein said correlated signal comprises fast-time correlator outputs, and wherein said method further comprises down-sampling said fast-time correlator outputs to thereby produce slow-time correlator outputs before applying said FrFT.

18. The method according to claim 10, further comprising pre-processing said estimated Doppler rate before determining said error values and said measured distance.

* * * * *